United States Patent
Tsujioka et al.

(10) Patent No.: US 12,190,096 B2
(45) Date of Patent: Jan. 7, 2025

(54) VEHICULAR SOFTWARE UPDATE MANAGEMENT SYSTEM AND EXECUTION BY ELECTRONIC CONTROL UNIT

(71) Applicant: HONDA MOTOR CO., LTD., Tokyo (JP)

(72) Inventors: Takashi Tsujioka, Tokyo (JP); Satomi Tomokuni, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/082,944

(22) Filed: Dec. 16, 2022

(65) Prior Publication Data
US 2023/0259351 A1    Aug. 17, 2023

(30) Foreign Application Priority Data

Feb. 15, 2022  (JP) .................................. 2022-021062
Aug. 31, 2022  (JP) .................................. 2022-137518

(51) Int. Cl.
G06F 8/65    (2018.01)
B60W 50/00   (2006.01)

(52) U.S. Cl.
CPC ........... *G06F 8/65* (2013.01); *B60W 50/0098* (2013.01)

(58) Field of Classification Search
CPC .............................. G06F 8/65; B60W 50/0098
USPC ................................................. 717/168–174
See application file for complete search history.

(56) References Cited

U.S. PATENT DOCUMENTS

| 8,561,054 B2* | 10/2013 | Smirnov .................. G06F 8/64 |
| | | 717/121 |
| 9,288,270 B1* | 3/2016 | Penilla ................. H04L 67/141 |
| 9,443,358 B2* | 9/2016 | Breed ....................... G06F 8/65 |
| 9,720,680 B2* | 8/2017 | Diedrich ............. H04B 1/3822 |

(Continued)

FOREIGN PATENT DOCUMENTS

| JP | 2010-137643 A | 6/2010 |
| JP | 2013-84143 A  | 5/2013 |

(Continued)

OTHER PUBLICATIONS

Azizian, et al., "Vehicle Software Updates Distribution with SDN and Cloud Computing", IEEE, pp. 74-79 (Year: 2017).*

(Continued)

*Primary Examiner* — Anil Khatri
(74) *Attorney, Agent, or Firm* — Rankin, Hill & Clark LLP

(57) ABSTRACT

A program management device including a communication unit that communicates with an external device, a control unit that executes a vehicle control program for controlling the vehicle, a first memory where the vehicle control program is stored, a second memory where the vehicle control program is stored, a third memory where an irrespective program is stored to perform control that is irrespective of driving of the vehicle, and a program update unit that executes first processing of storing in at least one of the first memory and the second memory a vehicle control update program received by the communication unit, the vehicle control update program being used to update the vehicle control program, and second processing of storing in the third memory a non-control update program received by the communication unit, the non-control update program being used to update the irrespective program.

13 Claims, 12 Drawing Sheets

(56) References Cited

U.S. PATENT DOCUMENTS

| | | | |
|---|---|---|---|
| 9,946,531 B1* | 4/2018 | Fields | A61B 5/4064 |
| 10,423,401 B2* | 9/2019 | Tschache | G06F 9/44536 |
| 10,474,450 B1* | 11/2019 | Chim | H04L 67/12 |
| 10,942,725 B2* | 3/2021 | Jayaraman | H04W 4/50 |
| 11,390,290 B2* | 7/2022 | Kurimoto | B60W 50/045 |
| 11,720,349 B2* | 8/2023 | Fukuyo | G06F 8/454 |
| | | | 717/170 |
| 11,851,072 B2* | 12/2023 | Hori | B60W 50/0098 |
| 11,880,670 B2* | 1/2024 | McFarland, Jr. | G06F 8/65 |
| 11,886,860 B2* | 1/2024 | Pal | G06F 8/65 |
| 11,928,459 B2* | 3/2024 | Harata | G06F 3/0659 |
| 12,074,952 B2* | 8/2024 | Satoh | G06F 21/445 |
| 2020/0285458 A1 | 9/2020 | Matsuda et al. | |
| 2021/0191708 A1 | 6/2021 | Yang | |

FOREIGN PATENT DOCUMENTS

| | | |
|---|---|---|
| JP | 2016-170471 A | 9/2016 |
| JP | 2019-144669 A | 8/2019 |
| JP | 2020-144682 A | 9/2020 |
| JP | 2021-24555 A | 2/2021 |
| JP | 2021-60792 A | 4/2021 |
| JP | 2021-128362 A | 9/2021 |

OTHER PUBLICATIONS

Onuma et al., "ECU Software Updating in Future Vehicle Networks", IEEE, pp. 35-40 (Year: 2017).*

Plappert et al., "Secure and Lightweight ECU Attestations for Resilient Over-the-Air Updates in Connected Vehicles", ACM, pp. 283-297 (Year: 2023).*

Steger et al., "An Efficient and Secure Automotive Wireless Software Update Framework", IEEE, pp. 2181-2193 (Year: 2018).*

Steger et al., "SecUp: Secure and Efficient Wireless Software Updates for Vehicles", IEEE, 626-638 (Year: 2016).*

Wang et al., "Improved Rule Installation for Real-Time Query Service in Software-Defined Internet of Vehicles", IEEE, pp. 225-235 ( Year: 2017).*

Japanese Office Action dated Apr. 2, 2024 issued in corresponding Japanese application No. 2022-137518; English machine translation included (9 pages).

Japanese Office Action from corresponding JP Application No. 2022-137518, dated Oct. 22, 2024, with English translation, 13 pages.

* cited by examiner ent VEHICULAR SOFTWARE UPDATE
MANAGEMENT SYSTEM AND EXECUTION
BY ELECTRONIC CONTROL UNIT

INCORPORATION BY REFERENCE

The present application claims priority under 35 U.S.C. § 119 to Japanese Patent Application No. 2022-021062 filed on Feb. 15, 2022 and Japanese Patent Application No. 2022-137518 filed on Aug. 31, 2022. The content of the applications is incorporated herein by reference in its entirety.

BACKGROUND OF THE INVENTION

Field of the Invention

The present invention relates to a program management device, a program management method, and a recording medium.

Description of the Related Art

In recent years, the functions of software that controls vehicles have been enhanced for the purpose of improving traffic safety and reducing $CO_2$ emission. Techniques have also been proposed to update programs that are executed by an electronic control unit (ECU) mounted on vehicles. For example, Japanese Patent Laid-Open No. 2019-144669 discloses the configuration in which a storage unit for storing programs includes a vehicle control program storage area for storing a control program and a second program storage area for storing an update program which is an updated version of the control program. According to the configuration, the update program can be stored in the storage unit even during execution of the control program, which can reduce the restriction of timing for program update.

SUMMARY OF THE INVENTION

As described in Japanese Patent Laid-Open No. 2019-144669, the configuration of a plurality of storage areas provided for storing programs requires a large storage capacity as compared with the size of the programs. With advancement in vehicle control technology and infotainment, the number and complexity of programs used in vehicles are increasing.

For this reason, a plurality of storage areas are provided to store the programs, and this requires a large-capacity storage device to be mounted on the vehicles. Even if the large-capacity storage device is adopted, the storage capacity may become insufficient at the event of program update.

The present invention has been made in view of such background circumstances, and it is an object of the present invention to reduce the restriction of timing for updating the programs for use in a vehicle, by a method less likely to cause a substantial increase in capacity of the storage area or less likely to cause an insufficient storage area.

One aspect for achieving the above object relates to a program management device. The program management device includes a communication unit that communicates with an external device that is present outside a vehicle, a control unit that executes a vehicle control program for controlling the vehicle, a first program storage area where the vehicle control program is stored, a second program storage area where the vehicle control program is stored, a third program storage area where an irrespective program is stored to perform control that is irrespective of driving of the vehicle, and a program update unit that executes first processing of storing in at least one of the first program storage area and the second program storage area a vehicle control update program received by the communication unit, the vehicle control update program being used to update the vehicle control program, and second processing of storing in the third program storage area a non-control update program received by the communication unit, the non-control update program being used to update the irrespective program.

According to the above configuration, while the vehicle control program is updated, the vehicle control program is held in an area that is not influenced by the update. This makes it possible to reduce the restriction of timing for updating the program. Since the third program storage area where the non-control update program is stored is not duplexed, the increase in storage capacity of the storage area can be restrained. This makes it possible to restrain the increase in storage capacity of the storage area for storing programs of the vehicle and to thereby avoid an insufficient storage area for storing the programs.

DETAILED DESCRIPTION OF THE
PREFERRED EMBODIMENT

Figure 1:
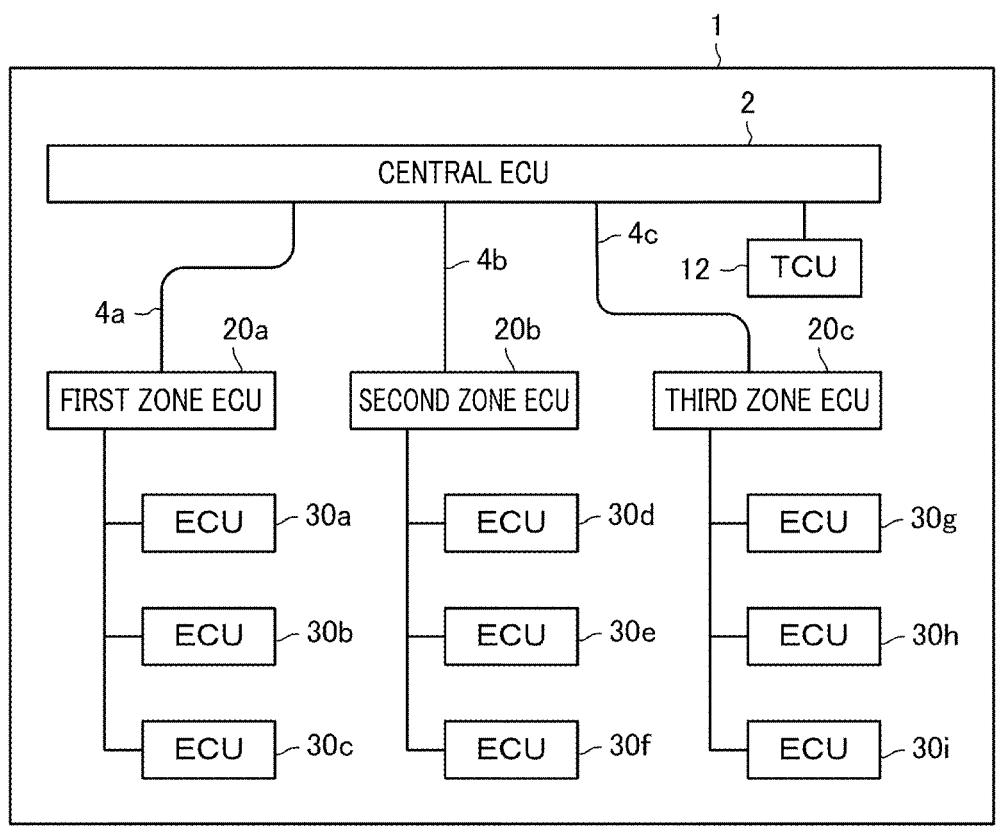
FIG. 1 is a schematic configuration diagram of a control system for a vehicle.

FIG. 1 is a diagram showing a control system 1 for a vehicle. The control system 1 includes a central ECU 2 that provides general control and information processing of a vehicle. Hereinafter, the vehicle mounted with the control system 1 is defined as an own vehicle. The own vehicle is specifically a vehicle V described later. The central ECU 2 is connected to communication lines including communication lines 4a, 4b and 4c. The central ECU 2 implements the function of a gateway to manage transfer of communication data among these communication lines. The central ECU 2 is connected to a telematics control unit (TCU) 12, which is a wireless device in compliance with communication standards of mobile communication systems. The central ECU 2 uses the TCU 12 to execute over the air (OTA) management. The OTA management includes control on processing of downloading update programs of in-vehicle devices included in the vehicle from a server outside the vehicle, and processing of applying the downloaded update programs to the in-vehicle devices.

The communication lines 4a, 4b, and 4c are connected to a first zone ECU 20a, a second zone ECU 20b, and a third zone ECU 20c, respectively. The first zone ECU 20a is connected to ECUs 30a, 30b, and 30c, and the second zone ECU 20b is connected to ECUs 30d, 30e, and 30f. The third zone ECU 20c is connected to ECUs 30g, 30h, and 30i.

Hereinafter, the first zone ECU 20a, the second zone ECU 20b, and the third zone ECU 20c are also collectively referred to as zone ECUs 20, and the ECUs 30a, 30b, 30c, 30d, 30e, 30f, 30g, 30h, and 30i are also collectively referred to as ECUs 30.

The ECUs 30 can include, for example, a map positioning unit (MPU), a multi view camera (MVC)-ECU, a parking support (PKS)-ECU, and/or an advanced driver-assistance system (ADAS)-ECU, and other ECUs that control the operation of various devices and sensors included in the own vehicle. Such devices and sensors may include a driving motor that causes the own vehicle to travel, maneuvering devices such as an accelerator and a brake, a vehicle stability assist (VSA) device, batteries, lamp bodies such as headlamps, window motors to drive door windows, actuators to drive door locking mechanisms, door lock sensors, door open/close sensors, temperature sensors, exterior cameras, interior cameras, etc.

The zones ECU 20 are each connected to a plurality of ECUs 30 provided within an identical section of vehicle body space of the own vehicle, or a plurality of ECUs 30 that control the operation of the devices and the sensors provided in the identical section.

The central ECU 2 may be connected to other control devices and equipment in addition to the zone ECUs 20. Such control devices and equipment may include an infotainment control box (ICB), speakers, a microphone, an instrument panel, steering switches, a global navigation satellite system (GNSS) sensor, a touch panel, etc.

In the present embodiment, the communication lines 4a, 4b, and 4c are each constituted of a CAN bus that performs communication in compliance with CAN communication standards, for example. Hereafter, the communication lines 4a, 4b, and 4c are also collectively referred to as communication lines 4. Here, the communication lines 4 correspond to an in-vehicle network in this disclosure. In addition, the zone ECUs 20 connected to the communication lines 4 correspond to a plurality of electronic control devices in this disclosure.

The zone ECUs 20 connected to the communication lines 4 send out transmission data in a single frame or as a row of a plurality of frames to the communication lines 4 in accordance with the CAN communication standards based on the conventional art. In accordance with the CAN communication standards, each frame to be sent out includes an identification code (ID), and each of the zone ECUs 20, which have received the frame, determines whether or not the frame is destined to itself based on the ID included in the frame.

Figure 2:
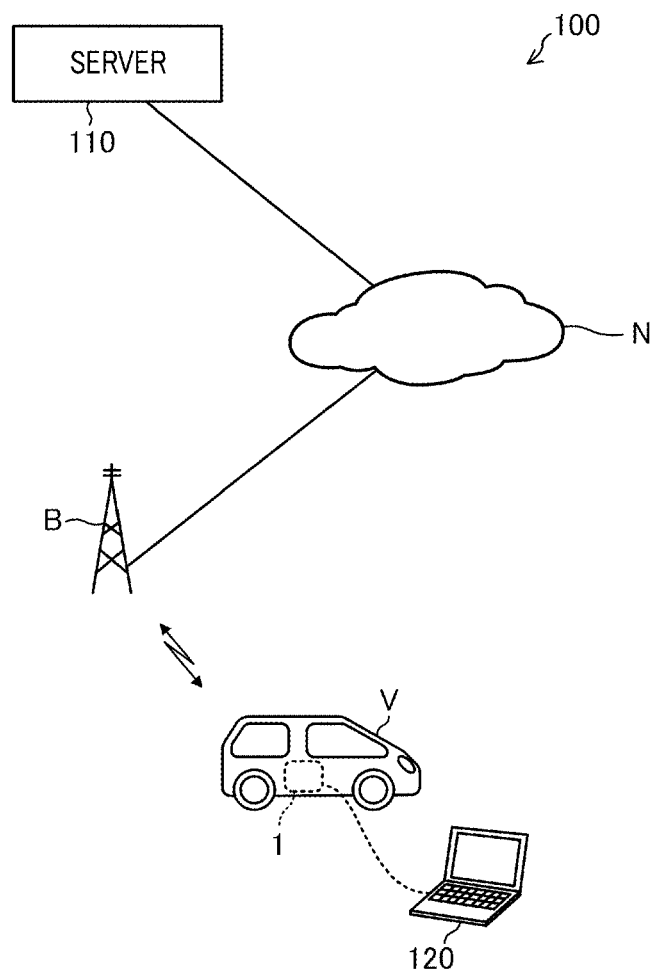
FIG. 2 shows schematic configuration of a program management system.

FIG. 2 shows schematic configuration of a program management system 100. The program management system 100 is a system that enables the update of the programs executed by various ECUs constituting the control system 1. The program management system 100 includes a server 110 and a vehicle diagnostic device 120.

The server 110 is connected to the control system 1 through a communication network N.

The communication network N includes, for example, cellular networks, Wi-Fi (registered trademark) networks, Bluetooth (registered trademark), Internet, wide area networks (WANs), local area networks (LANs), public lines, provider devices, leased lines, base stations, etc. FIG. 2 illustrates a base station B. The TCU 12 included in the control system 1 performs cellular communication with the base station B so as to execute data communication with external devices through the communication network N. The TCU 12 is configured with a computer including a transceiver, a receiver, a microcomputer, and a memory.

By executing communication with the server 110 via the TCU 12, the control system 1 can download from the server 110 the update data to update programs executed by various ECUs in the control system 1. The means for the control system 1 to download the update data from the server 110 and update the programs corresponds to the OTA described above.

The server 110 corresponds to an example of the external device of the control system 1. The server 110 is configured with a server computer. The TCU 12 corresponds to an example of the communication unit.

The vehicle diagnostic device 120 is installed in dealerships and workshops which handle the vehicle V mounted with the control system 1. The vehicle diagnostic device 120 is connected by a cable to an unillustrated data link connector (DLC) included in the control system 1. The control system 1 can perform, for example, update of the programs executed by the control system 1 by communicating with the vehicle diagnostic device 120.

Here, update of the programs of the ECUs refers to rewriting the programs executed by the ECUs to different versions of the programs. The update of the programs of the ECUs may include rewriting, together with the programs, any data referenced when the ECUs execute the programs and/or data generated or modified by execution of the programs. The update of the programs of the ECUs may include rewriting the programs executed by the ECUs to the same versions of the programs.

Figure 3:
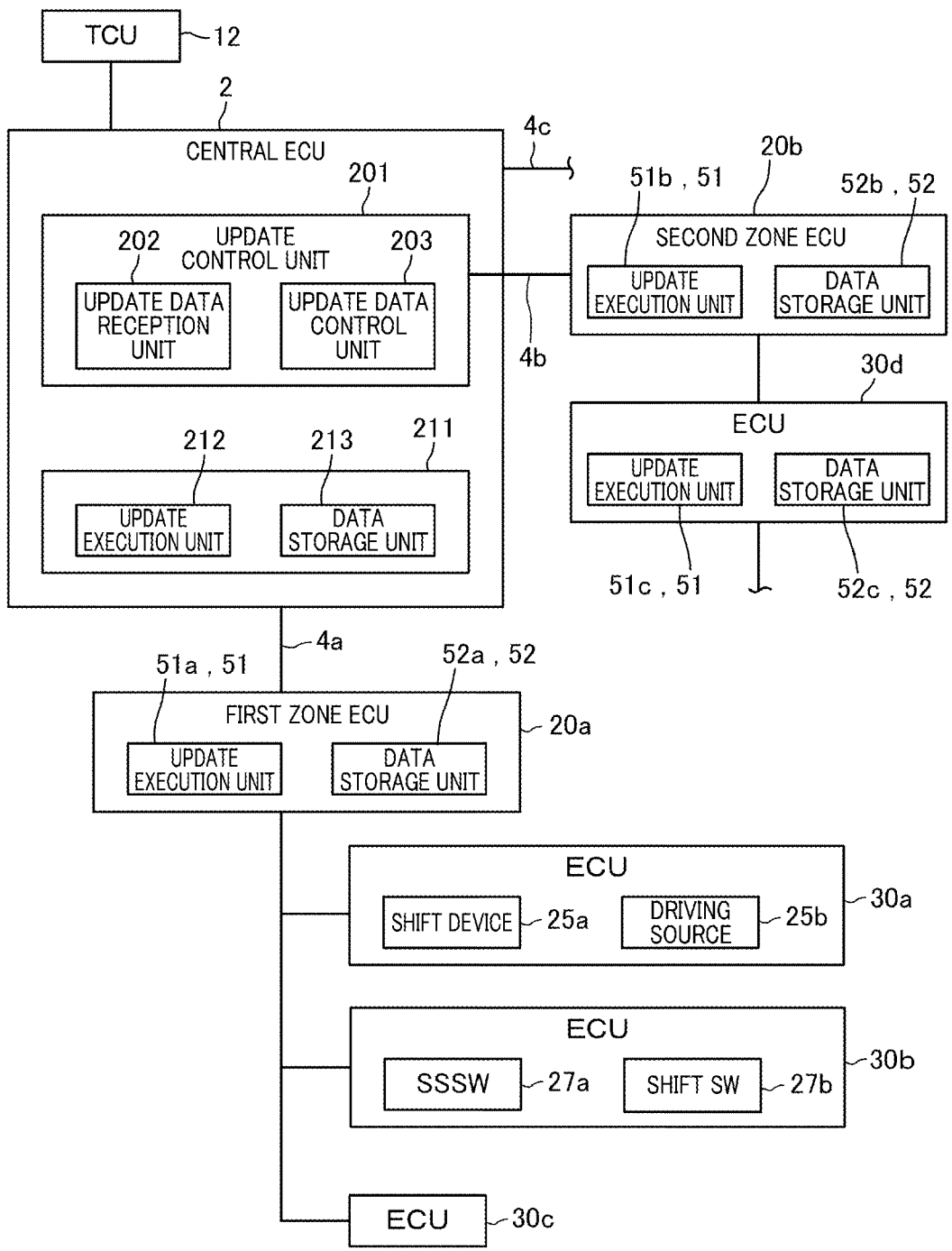
FIG. 3 is a block diagram showing principal part of the control system.

FIG. 3 is a block diagram showing principal part of the configuration of the control system 1. FIG. 3 shows part of the configuration relating to program update in the control system 1, and does not prevent the control system 1 from having the configuration not shown in FIG. 3.

In the control system 1, the ECUs including the central ECU 2, the zone ECUs 20, and the ECUs 30 each include a processor and a storage unit. The processor is constituted of, for example, a central processing unit (CPU), a micro controller unit (MCU), and a micro processor unit (MPU). The storage unit stores programs executed by the processor and data processed by the processor in a non-volatile manner. The storage unit is, for example, a read only memory (ROM). Each of the ECUs may also include a random access memory (RAM) which forms work areas for temporarily storing the programs and the data. Each of the ECUs may also be constituted of an integrated circuit which integrally includes a processor, a ROM and a RAM. Each of the ECUs may also be configured to include a processor, a ROM, and a RAM as independent hardware.

The central ECU 2 includes an update control unit 201, and a data processing unit 211 as functional units relating to the program update. The update control unit 201 and the data processing unit 211 may be hardware included in the central ECU 2. The update control unit 201 and the data processing unit 211 may be functional units implemented through collaboration between software and hardware when the processor of the central ECU 2 executes the programs.

The update control unit 201 includes an update data reception unit 202 and an update data control unit 203. The update data reception unit 202 controls the TCU 12 to receive update data from the server 110 to update the programs. The update data control unit 203 controls processing in which various ECUs including the central ECU 2 update the programs by using update data received by the update data reception unit 202.

FIG. 3 illustrates the central ECU 2, the first zone ECU 20a, the second zone ECU 20b, and the ECU 30d as control targets of the update control unit 201, though this configuration is merely an example. There is no limit to the number of ECUs as the control targets of the update control unit 201. The update control unit 201 controls the update of the programs executed by at least some of the ECUs included in the control system 1. The update control unit 201 may control update of the programs of all the ECUs or almost all the ECUs included in the control system 1.

The data processing unit 211 includes an update execution unit 212 and a data storage unit 213. The data storage unit 213 corresponds to the storage unit described above. The data storage unit 213 stores a program executed by the central ECU 2 and data related to the program. The update execution unit 212 updates the program stored in the data storage unit 213. The update execution unit 212 corresponds to an example of the program update unit.

The first zone ECU 20a includes an update execution unit 51a and a data storage unit 52a.

The data storage unit 52a stores programs executed by the first zone ECU 20a and data related to the programs. The update execution unit 51a updates the programs stored in the data storage unit 52a.

The second zone ECU 20b includes an update execution unit 51b and a data storage unit 52b.

The data storage unit 52b stores programs executed by the second zone ECU 20b and data related to the programs. The update execution unit 51b updates the programs stored in the data storage unit 52b.

Specific examples of the ECU 30d may include an entry ECU. The entry ECU is connected to a LF/RF antenna (not illustrated) which provides wireless communication with an electronic key of the own vehicle. The electronic key, which is an electronic device having a wireless communication function, is referred to as a smart key or a FOB key. In collaboration with other in-vehicle ECUs, the entry ECU processes user access to the control system 1 from the outside of the vehicle, and implements the operation of a so-called smart entry.

The ECU 30d includes an update execution unit 51c and a data storage unit 52c. The data storage unit 52a stores programs executed by the ECU 30d and data related to the programs. The update execution unit 51c updates the programs stored in the data storage unit 52c.

Here, when the update execution units 51a, 51b, and 51c are not distinguished, they are referred to as update execution units 51. The update execution units 51 may include, in addition to the update execution units 51a, 51b, and 51c, other update execution units included in ECUs not shown in FIG. 3. Similarly, when the data storage units 52a, 52b, and 52c are not distinguished, they are stated as data storage units 52. The data storage units 52 may include, in addition to the data storage units 52a, 52b, and 52c, other data storage units included in ECUs not shown in FIG. 3. The update execution units 51 correspond to examples of the program update unit.

FIG. 3 shows the ECU 30a and the ECU 30b as examples of the ECUs 30 connected to the first zone ECU 20a. In the present embodiment, the ECU 30a, which is the ECU that controls driving of the own vehicle, can be called a driving device. In the present embodiment, the ECU 30a, which is the ECU that accepts operation of the driving source of the own vehicle, includes a shift device 25a, and a driving source 25b. The ECU 30b can be called a maneuvering operation device. The ECU 30b includes a start-stop switch (SSSW) 27a and a shift switch (SW) 27b. The SSSW 27a and the shift SW 27b are provided at positions operable by a user who drives the vehicle V.

The driving source 25b, which is a driving source to cause the vehicle V to travel, is a motor or an internal combustion engine, or a combination of a motor and an internal combustion engine. The shift device 25a controls a transmission mechanism that transmits output of the driving source 25b to drive wheels of the vehicle V in response to the operation of the shift SW 27b. When the driving source 25b is constituted of only a motor, the shift device 25a may not be a device that controls the transmission mechanism. For example, the shift device 25a may be a circuit that supplies current to the driving source 25b or a circuit that controls the rotation of the driving source 25b.

Figure 4:
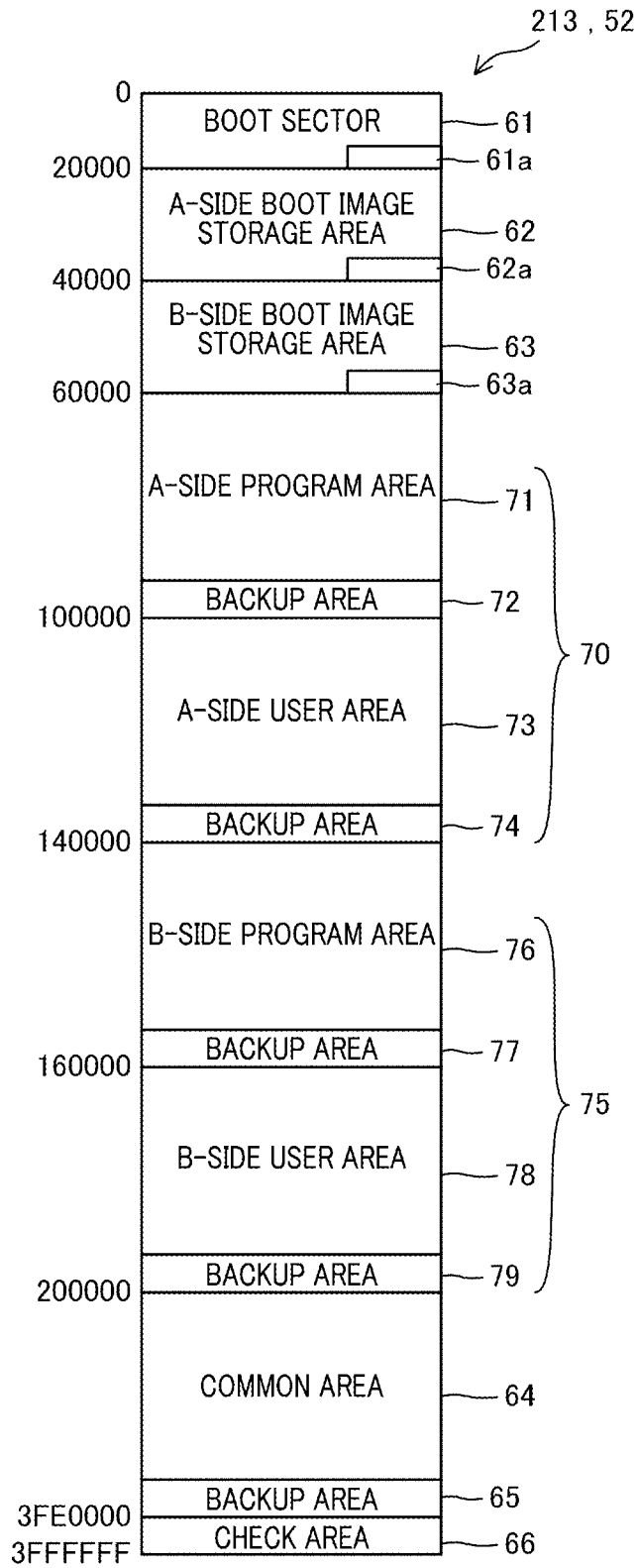
FIG. 4 is a schematic diagram showing a configuration example of a data storage unit.

FIG. 4 is a schematic diagram showing a configuration example of the data storage unit 213. The data storage units 52 may have a similar configuration to the data storage unit 213.

The data storage unit 213, which corresponds to the storage unit described before, has a non-volatile storage area. The data storage unit 213 stores programs and data in the storage area in a rewritable manner. The data storage unit 213 is constituted of, for example, a semiconductor storage device or a magnetic recording device. In a specific example, the data storage unit 213 is constituted of a flash ROM or electrically erasable programmable ROM (EEPROM). In the following description, programs and data stored in the data storage unit 213 and the data storage units 52 are stated as programs. In other words, the programs referred to in the following description include data that is referenced, generated, or processed when the programs are executed by the processor. The programs and data as a whole can be paraphrased as software. Specifically, the program management system 100 has the function of managing and updating the software of the control system 1 mounted on the vehicle V.

The storage area of the data storage unit 213 is logically divided into a plurality of areas. The respective areas of the data storage unit 213 and the programs stored in the data storage unit 213 are identified by the address of the data storage unit 213.

The data storage unit 213 is provided with a boot sector 61, an A-side boot image storage area 62, a B-side boot image storage area 63, a common area 64, a backup area 65, a check area 66, a first program storage area 70, and a second program storage area 75. The common area 64 corresponds to an example of the third program storage area.

As described above, the data storage unit 52 is configured in a similar manner to the data storage unit 213. Specifically, the data storage unit 52 is provided with a boot sector 61, an A-side boot image storage area 62, a B-side boot image storage area 63, a common area 64, a backup area 65, a check area 66, a first program storage area 70, and a second program storage area 75. Here, as an example, the case where the central ECU 2 uses the data storage unit 213 is described.

The use of the data storage unit 52a by the first zone ECU 20a, the use of the data storage unit 52b by the second zone ECU 20b, and the use of the data storage unit 52c by the ECU 30d are executed in a similar manner to the use of the data storage unit 213. The use of the data storage units 52 by other ECUs is also executed in a similar manner.

The storage area of the data storage unit 213 is classified into an A-side and a B-side. The A-side boot image storage area 62 and the first program storage area 70 belong to the A-side. The B-side boot image storage area 63 and the second program storage area 75 belong to the B-side. The boot sector 61, the common area 64, the backup area 65, and the check area 66 belong to neither the A-side nor the B-side.

The storage area on the A-side and the storage area on the B-side store programs independently of each other. The central ECU 2 can perform various operations that the central ECU 2 is required to perform by using the programs stored in one of the A-side storage area and the B-side storage area. In other words, the central ECU 2 can perform the operation as the central ECU 2 when the programs are successfully stored in one of the A-side and the B-side in the data storage unit 213.

The update execution unit 212 selects one of the A-side and the B-side in the case of updating the programs stored in the data storage unit 213.

As an example, the case where the update execution unit 212 selects the A-side to update a program will be described. In this example, the update execution unit 212 executes the processing of writing a new program to the first program storage area 70, and then executes the processing of confirming that the program is successfully written. Here, when the writing of the program to the first program storage area 70 fails, the update execution unit 212 needs to retry the update of the program. The central ECU 2 is not able to control the vehicle V by executing the programs written in the first program storage area 70 until the program update in the first program storage area 70 is successfully completed. However, the central ECU 2 can control the vehicle V by executing the program stored in the second program storage area 75. The same is true when the update execution unit 212 selects the B-side. In this way, when the data storage unit 213 performs the program update for one side, out of the A-side and the B-side, the other side has executable program stored therein, and therefore the success or failure of the program update does not significantly influence the control of the vehicle V. Therefore, the restriction relating to the timing for the program update is relieved, and it is not impossible to update the program while the vehicle V travels, for example.

The boot sector 61 stores a boot loader. The boot loader is a program that is executed first by the processor of the central ECU 2 when the central ECU 2 is started. The processor executes necessary processing for the basic operation of the central ECU 2 by executing the boot loader. The boot sector 61 stores an active program specification data 61a. The active program specification data 61a is included in the boot loader or stored in an area referenced by the boot loader. The active program specification data 61a is data that specifies whether a program to be executed by the central ECU 2 subsequent to the boot loader is a program on the A-side or a program on the B-side. Specifically, the active program specification data 61a is the address of a boot image stored in the A-side boot image storage area 62 or the address of a boot image stored in the B-side boot image storage area 63.

The boot image is a basic control program executed by the processor of the central ECU 2 subsequent to the boot loader. The A-side boot image storage area 62 stores a boot image to be used when the program stored in the first program storage area 70 is executed.

The A-side boot image storage area 62 stores a leading address 62a. The leading address 62a is, for example, a leading address of the program stored in the A-side program area 71 that is included in the first program storage area 70. The B-side boot image storage area 63 stores a boot image to be used when the program stored in the second program storage area 75 is executed. The B-side boot image storage area 63 stores a leading address 63a. The leading address 63a is, for example, a leading address of the program stored in the B-side program area 76 that is included in the second program storage area 75.

The first program storage area 70 includes an A-side program area 71, a backup area 72, an A-side user area 73, and a backup area 74. The A-side program area 71 and the A-side user area 73 store programs.

The A-side program area 71 and the A-side user area 73 are areas for storing programs for the ECUs to control the vehicle V. The A-side user area 73 may store programs which are executed by the ECUs and are not directly related to the control of the vehicle V.

The backup area 72 is used to expand the storage capacity of the A-side program area 71. When the storage capacity of the A-side program area 71 is insufficient in the processing in which the update execution unit 212 stores a program in the A-side program area 71, the backup area 72 serves as an extension area of the A-side program area 71. In this case, the update execution unit 212 stores the program in the A-side program area 71 and the backup area 72. The backup area 74 is used to expand the storage capacity of the A-side user area 73. When the storage capacity of the A-side user area 73 is insufficient in the processing in which the update execution unit 212 stores a program in the A-side user area 73, the backup area 74 serves as an extension area of the A-side user area 73. In this case, the update execution unit 212 stores the program in the A-side user area 73 and the backup area 74. The backup areas 72 and 74 correspond to examples of the first program backup storage area.

The second program storage area 75 includes a B-side program area 76, a backup area 77, a B-side user area 78, and a backup area 79. The B-side program area 76 and the B-side user area 78 store programs.

The B-side program area 76 and the B-side user area 78 are areas for storing programs for the ECUs to control the vehicle V. The B-side user area 78 may store programs which are executed by the ECUs and are not directly related to the control of the vehicle V.

The backup area 77 is used to expand the storage capacity of the B-side program area 76. When the storage capacity of the B-side program area 76 is insufficient in the processing in which the update execution unit 212 stores a program in the B-side program area 76, the backup area 77 serves as an extension area of the B-side program area 76. In this case, the update execution unit 212 stores the program in the B-side program area 76 and the backup area 77. The backup area 79 is used to expand the storage capacity of the B-side user area 78. When the storage capacity of the B-side user area 78 is insufficient in the processing in which the update execution unit 212 stores a program in the B-side user area 78, the backup area 79 serves as an extension area of the B-side user area 78. In this case, the update execution unit 212 stores the program in the B-side user area 78 and the backup area 79. The backup areas 77 and 79 correspond to examples of the first program backup storage area.

The common area 64 is a storage area for storing programs that are irrespective of the control of the vehicle V. The backup area 65 is used to expand the storage capacity of the common area 64. When the storage capacity of the common area 64 is insufficient in the processing in which the update execution unit 212 stores a program in the common area 64, the backup area 65 serves as an extension area of the common area 64. The check area 66 stores data for error detection for the programs stored in the data storage unit 213.

The backup area 65 corresponds to an example of the third program backup storage area.

The programs stored in the A-side program area 71, the A-side user area 73, the B-side program area 76, and the B-side user area 78 are programs to control the vehicle V. The programs are called vehicle control programs. The vehicle control programs are related to the control relating to travel of the vehicle V and the control required during the travel of the vehicle V. Main bodies that execute the vehicle control programs are the central ECU 2, the first zone ECU 20a, the second zone ECU 20b, the ECU 30d, and other ECUs, and these main bodies correspond to examples of the control unit. For example, programs causing the central ECU 2 to execute operation described with reference to FIGS. 5 to 9 are included in the vehicle control programs. Therefore, the data storage unit 213 corresponds to an example of the recording medium in the present invention. Among the programs downloaded by the control system 1 from the server 110, programs and data for updating the vehicle control programs are called vehicle control update programs. The control system 1 having the configuration of storing these programs corresponds to an example of the program management device.

Programs stored in the common area 64 are called irrespective programs. The irrespective programs are irrespective of the control relating to travel of the vehicle V and the control essential in travel of the vehicle V, among the processings executed by the control system 1.

Among the programs downloaded by the control system 1 from the server 110, programs and data for updating the irrespective programs are called non-control update programs.

Here, the control relating to travel of the vehicle V includes control relating to acceleration, deceleration, stopping, and steering of the vehicle V. For example, when the user performs operation for maneuvering or driving the vehicle V, the control relating to travel of the vehicle V includes controlling the vehicle V based on the user operation. In addition, the control relating to travel of the vehicle V includes control to execute the ADAS function or the PKS function without based on the user operation. The essential control during travel of the vehicle V includes control to operate auxiliary machines necessary for the vehicle V to travel. For example, the auxiliary machines include a meter panel, lamp bodies of the vehicle V, a wiper, a window washer, and an air conditioner. The essential control during travel of the vehicle V includes controlling cameras and radar devices to execute the ADAS function and the PKS function.

The irrespective programs stored in the common area 64 include, for example, programs relating to an infotainment function provided by the control system 1. The programs relating to the infotainment function refer to, for example, application programs relating to entertainment. Specifically, examples of the infotainment function may include reproducing music, receiving and outputting radio broadcasts, transmitting and receiving emails, receiving and outputting television broadcasts, searching information using networks such as the Internet, executing video games, and other functions relating to entertainment. The irrespective programs include, for example, programs relating to the functions to place orders or make reservation with external service providers by communicating with servers outside the vehicle V based on the operation of a touch panel mounted on the vehicle V. The external service providers refer to, for example, business operators who provide sales of articles including food and beverages, delivery of articles including food and beverages, car wash service, cleaning service, ticket sales or ticket booking service, and other services.

The programs stored in the A-side user area 73 and the B-side user area 78 are programs that are installed according to instructions of a user riding in the vehicle. For example, when the user operates the touch panel to specify a program to be desired to be installed and instruct to install the specified program, the update data reception unit 202 downloads the specified program from the server 110. The update data control unit 203 stores the program downloaded by the update data reception unit 202 in the A-side user area 73 or the B-side user area 78 included in the ECU that executes the program.

The programs stored in the A-side user area 73 and the B-side user area 78 are programs which are specified by the manufacturer of the vehicle V or the distributor of the vehicle V in particular. For example, the programs of this type are officially certified or qualified to be installed on the vehicle V by the manufacturer of the vehicle V or the distributor of the vehicle V.

The programs stored in the A-side user area 73 and the B-side user area 78 may include irrespective programs. Specifically, the A-side user area 73 and the B-side user area 78 are used to store programs specified by the manufacturer of the vehicle V or the distributor of the vehicle V, among the vehicle control programs and the irrespective programs. On the other hand, programs not specified by the manufacturer of the vehicle V or the distributor of the vehicle V are not stored in the A-side user area 73 and the B-side user area 78. Such programs are called third-party programs. The third-party programs are stored in the common area 64. It can be said that the common area 64 is an area for storing third-party irrespective programs.

Figure 5:
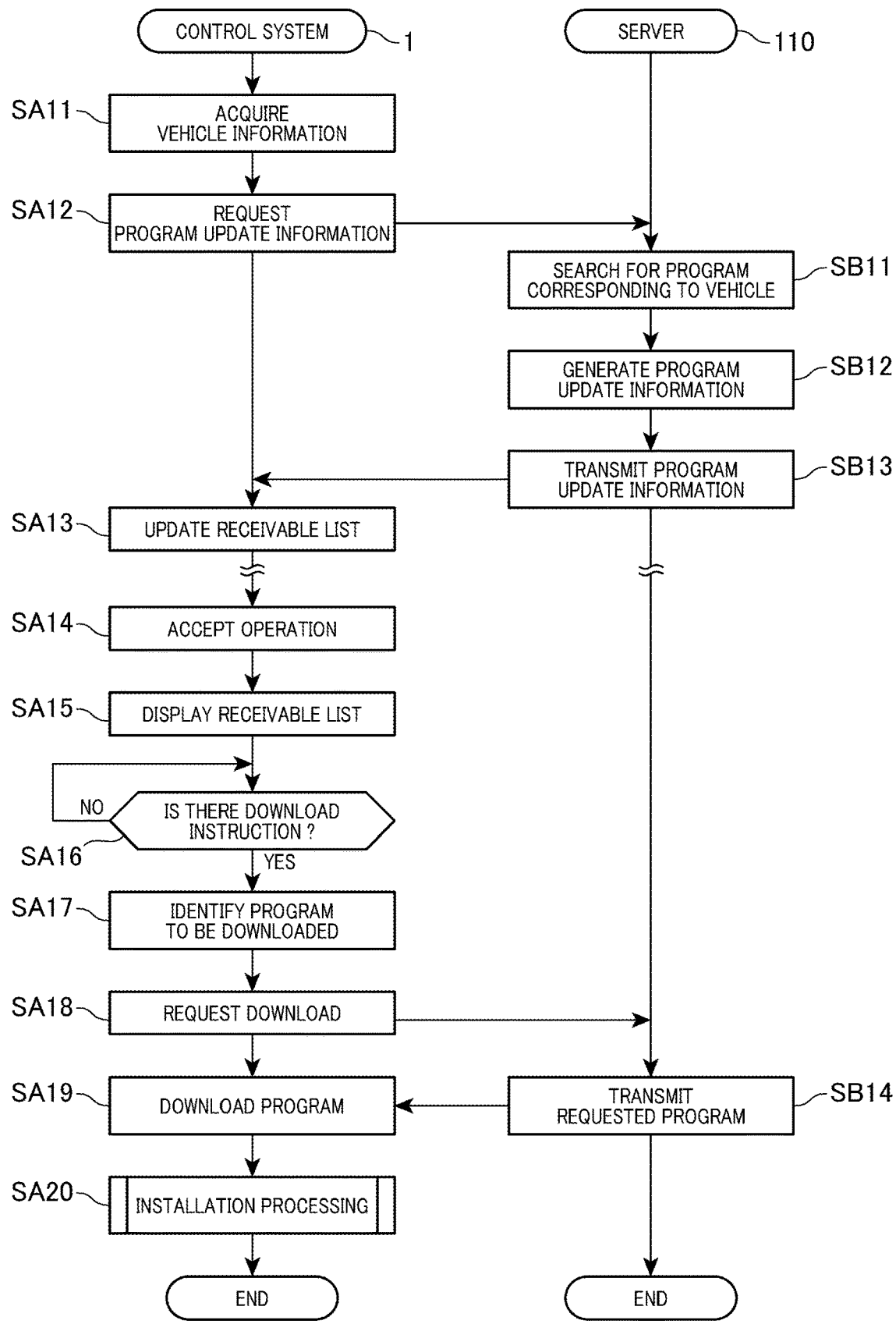
FIG. 5 is a sequence diagram showing operation of the program management system.

FIG. 5 is a sequence diagram showing operation of the program management system 100. Steps SA11 to SA20 indicate the operation of the control system 1, and steps SB11 to SB14 indicate the operation of the server 110. FIGS. 6, 7, 8 and 9 are flowcharts showing the details of the operation of the control system 1 in step SA20 of FIG. 5.

FIGS. 5 to 9 show the processing relating to the operation of the control system 1 to update programs.

In FIG. 5, the update data reception unit 202 executes steps SA11 to SA19. The control system 1 acquires vehicle information on the vehicle V (step SA11). The vehicle information is used by the server 110 to identify the types of programs and the versions of the programs compatible with the control system 1. The vehicle information includes, for example, a vehicle identification number of the vehicle V, the types of ECUs included in the control system 1, and the versions of the programs mounted on the ECUs.

The control system 1 acquires information held by the control system 1 and information held by the ECUs connected to the control system 1, and aggregates these information pieces into a single set of vehicle information.

The control system 1 requests program update information from the server 110 (step SA12). The program update information relates to the programs already stored in the control system 1. Specifically, the program update information includes the names and the versions of programs which can be updated, among the programs already stored in the control system 1. The program update information may also include information about the programs which can be used by the control system 1 and which are not stored in the control system 1. In this case, the program update information includes the names of the programs usable in the control system 1 and information indicating the outline of the programs. In step SA12, the control system 1 transmits the vehicle information acquired in step SA11 to the server 110 when requesting the program update information. The server 110 receives the request for the program update information and the vehicle information on the vehicle V.

Based on the request transmitted from the control system 1 and the vehicle information on the vehicle V, the server 110 searches for the programs corresponding to the vehicle V in a database not shown (step SB11). The server 110 stores the programs corresponding to a plurality of vehicles, including the vehicle V, in the database. The database may be included in the server 110, or may be a database server connected to the server 110 via the communication network N.

The server 110 generates program update information based on the result of database search (step SB12), and transmits the program update information to the control system 1 (step SB13). The control system 1 receives the program update information.

The control system 1 updates a receivable list based on the program update information received from the server 110 (step SA13). The receivable list is a list of programs that the control system 1 can download from the server 110. The receivable list includes programs updatable, among the programs stored in the control system 1, and programs usable by the control system 1 and not stored in the control system 1. The receivable list includes the names of the programs and the types or the outline of the programs.

The control system 1 and the server 110 repeatedly execute the operation of steps SA11 to SA13 and steps SB11 to SB13 at pre-set cycles. This allows the control system 1 to maintain a state of holding an up-to-date receivable list about the programs corresponding to the vehicle V.

The control system 1 starts program update when the user operates the touch panel or the like. When the user performs operation relating to the program update, the control system 1 accepts the user operation (step SA14). The control system 1 responds to the user operation by displaying the receivable list on, for example, a display mounted on the vehicle V (step SA15). In this point, the control system 1 determines whether or not the user has instructed to download the program (step SA16). For example, the user operates the touch panel to select a program to be downloaded and instruct the download of the selected program. During a period of time when the program download is not instructed (NO in step SA16), the control system 1 waits in step SA16.

When the program download is instructed (YES in step SA16), the control system 1 identifies the program to be downloaded based on the user instruction (step SA17). The control system 1 requests the server 110 to download the identified program (step SA18). The server 110 receives the download request made by the control system 1.

The server 110 transmits the program requested by the control system 1 to the control system 1 (step SB14). The program transmitted by the server 110 includes at least one of a vehicle control update program for updating a vehicle control program or installing a new vehicle control program and a non-control update program for updating an irrespective program or installing a new irrespective program. The control system 1 downloads the program transmitted by the server 110 (step SA19). The control system 1 then executes installation processing (step SA20). The installation processing includes storing the program downloaded in step SA19 in the corresponding data storage unit 52 or the data storage unit 213. The installation processing also includes processing of executing the vehicle control update program and/or the non-control update program to put the vehicle control program and/or the irrespective program in a state executable by the corresponding ECU. After installation, the program is stored in the corresponding data storage unit 52 or the data storage unit 213 in the state executable by the corresponding ECU.

Figure 6:
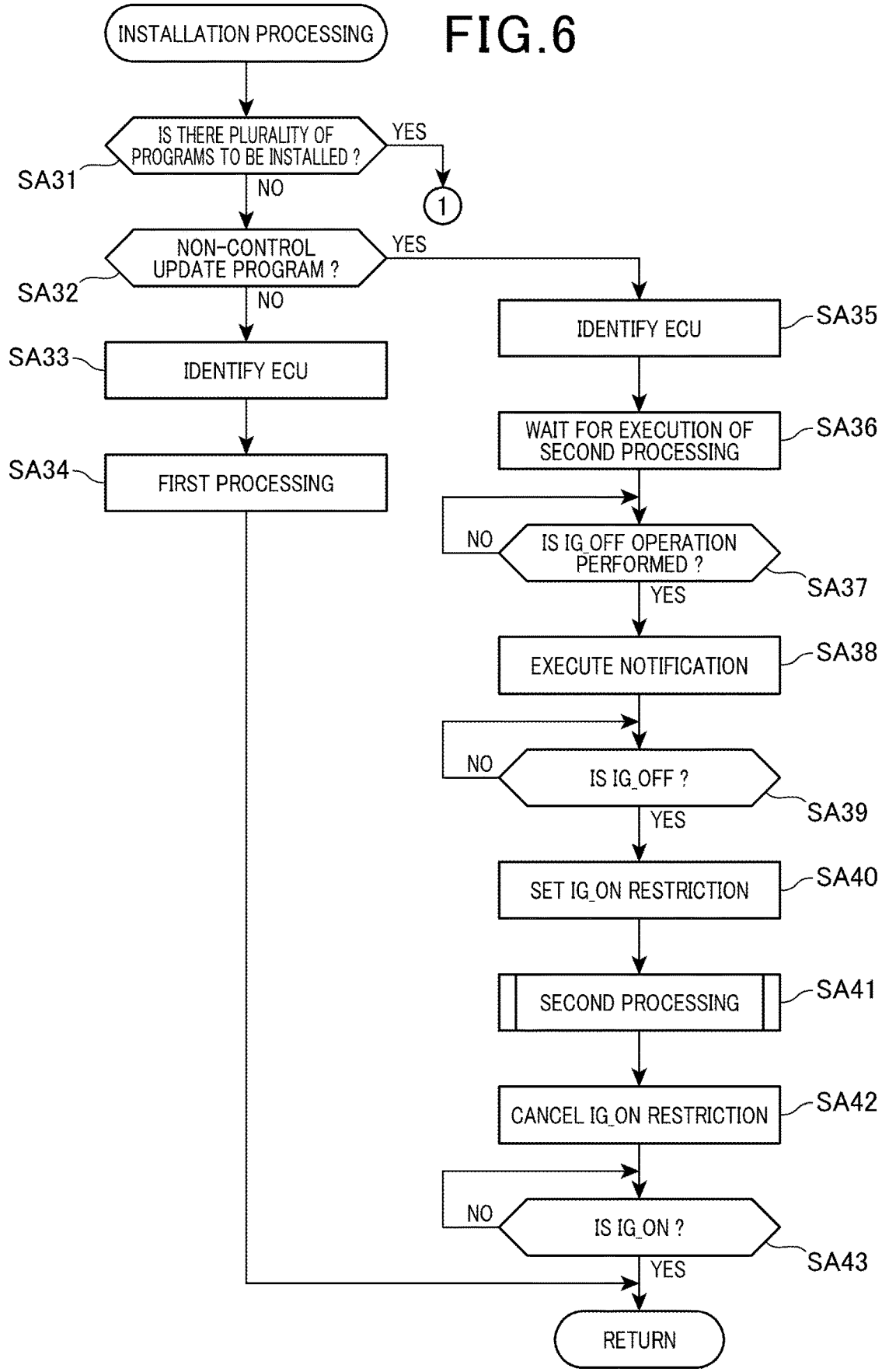
FIG. 6 is a flowchart showing operation of the control system.
Figure 7:
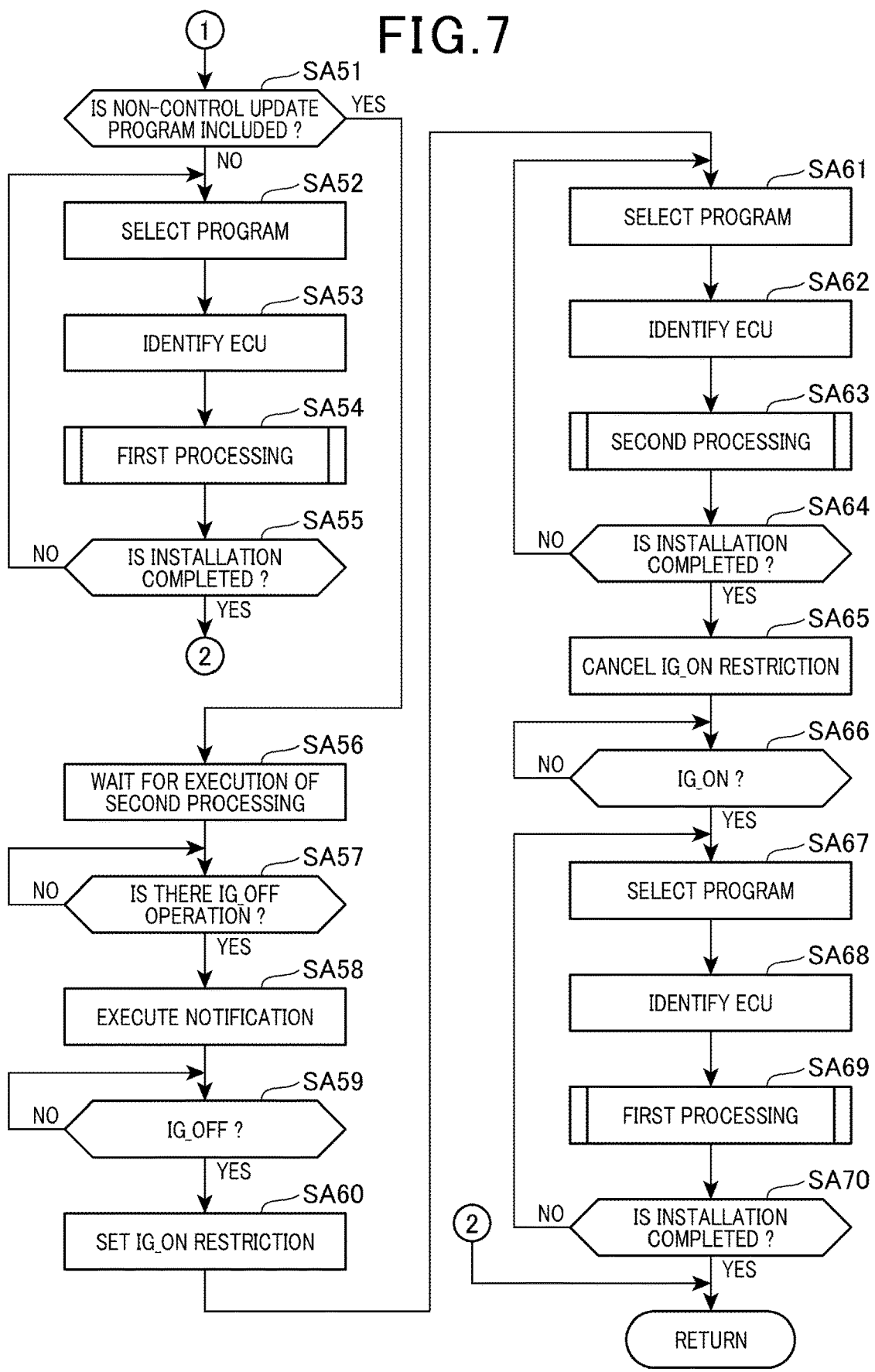
FIG. 7 is a flowchart showing operation of the control system.

FIGS. 6 and 7 show the details of the installation processing. In FIGS. 6 and 7, first processing and second processing described later are executed by the update execution unit 212 or the corresponding update execution unit 51, and the other operations are executed by the update data control unit 203. In the following description, the case where the update execution unit 212 executes the first processing and the second processing is taken as an example. However, the update execution units 51 can also execute similar operation.

The update data control unit 203 determines whether or not there is a plurality of programs to be installed in the control system 1 (step SA31). For example, when there are a plurality of programs downloaded in step SA19, the update data control unit 203 determines that there are a plurality of programs to be installed (YES in step SA31). In this case, the update data control unit 203 shifts to step SA51 described later.

When determination is made that there is only one program to be installed (NO in step SA31), the update data control unit 203 determines whether or not the program to be installed is a non-control update program (step SA32). When the program to be installed is not the non-control update program (NO in step SA32), the update data control unit 203 identifies the ECU to be subject to installation of the program (step SA33). In step SA33, the update data control unit 203 selects the ECU which installs the program, out of the central ECU 2, the first zone ECU 20a, the second zone ECU 20b, the ECU 30d, and other ECUs. The ECU identified by the update data control unit 203 then executes the first processing (step SA34) to install the vehicle control update program. The first processing will be described later in detail with reference to FIG. 8. After the first processing is executed, the control system 1 ends the processing.

Meanwhile, when the program to be installed is the non-control update program (YES in step SA32), the update data control unit 203 identifies the ECU to be subject to installation of the program (step SA35). The operation of step SA35 is similar to that of step SA33.

The update data control unit 203 shifts to a waiting state to wait for the second processing so as to cause the ECU identified in step SA35 to execute the second processing (step SA36). The second processing is the processing in which the update execution unit 212 or the corresponding update execution unit 51 installs the non-control update program. The update data control unit 203 determines whether or not the operation to put the vehicle V in an ignition-off (IG OFF) state is performed in the waiting state (step SA37).

Ignition-off of the vehicle V indicates the state where the driving source 25b of the vehicle V is stopped. For example, when the driving source 25b includes an internal combustion engine, the ignition-off state is the state where the operation of the internal combustion engine is stopped. When, for example, the driving source 25b includes a motor, the ignition-off state is the state where electric power supply to the motor is stopped and the control of the driving state of the motor is stopped. The ignition-off state can be paraphrased as a power-off state.

In contrast, the ignition-on state, which is the state other than the ignition-off state, refers to the state where the driving source 25b of the vehicle V is operating or operable. For example, when the driving source 25b includes the internal combustion engine, the ignition-on state is the state where the internal combustion engine is in operation.

When, for example, the driving source 25b includes the motor, the ignition-on state is the state where electric power is supplied to the motor or the driving state of the motor is under control. The operation of FIGS. 5, 6 and 7 is started when the vehicle V is in the ignition-on state.

The operation to switch the ignition-on state of the vehicle V to the ignition-off state, and the operation to switch the ignition-off state of the vehicle V to the ignition-on state is achieved by, for example, operation of the SSSW 27a by the user. The ignition-on state can be paraphrased as a power-on state.

When the operation to put the vehicle V in the ignition-off state is not performed (NO in step SA37), the update data control unit 203 waits. When the operation to put the vehicle V in the ignition-off state is performed (YES in step SA37), the update data control unit 203 executes notification to the user (step SA38). The notification in step SA38 informs the user that the vehicle V is not put in the ignition-on state until installation of the program is completed. In step SA38, the update data control unit 203 executes notification by, for example, displaying text or images on the display mounted on the vehicle V. In addition, the update data control unit 203 may execute notification by outputting sound from a speaker mounted on the vehicle V in step SA38.

After notification is performed, the update data control unit 203 determines whether or not the operation to put the vehicle V in the ignition-off state is performed (step SA39). When the operation to put the vehicle V in the ignition-off state is not performed (NO in step SA39), the update data control unit 203 waits. When the operation to put the vehicle V in the ignition-off state is performed (YES in step SA39), the update data control unit 203 sets ignition-on (IG ON) restriction (step SA40). The ignition-on restriction is a restriction to prevent the vehicle V from being in the ignition-on state until the second processing is completed. When the central ECU 2 sets the ignition-on restriction, the control system 1 maintains the ignition-off state even when the SSSW 27a is operated. When the ignition-on restriction is not set, the control system 1 shifts to the ignition-on state in response to operation of the SSSW 27a in the ignition-off state.

The ECU identified by the update data control unit 203 in step SA35 then executes the second processing (step SA41) to install the non-control update program. The second processing will be described later in detail with reference to FIG. 9. After the second processing is completed, the update data control unit 203 cancels the ignition-on restriction (step SA42). Based on the operation of SSSW 27a, the update data control unit 203 determines whether or not the vehicle V is shifted to the ignition-on state under the control of the first zone ECU 20a (step SA43). When the vehicle V does not shift to the ignition-on state (NO in step SA43), the update data control unit 203 waits. When the vehicle V is shifted to the ignition-on state (YES in step SA43), the update data control unit 203 ends the processing.

When determination is made that there is a plurality of programs to be installed (YES in step SA31), the update data control unit 203 determines whether or not the programs to be installed include any non-control update program (step SA51). When the programs to be installed do not include any non-control update program (NO in step SA51), the update data control unit 203 selects one vehicle control update program to be processed, out of one or more vehicle control update programs to be installed (step SA52). The update data control unit 203 identifies the ECU to be subject to installation of the program that is selected in step SA52 (step SA53). The processing of step SA54 is similar to that of step SA33. The ECU identified by the update data control unit 203 then executes the first processing (step SA54) to install the vehicle control update program. The first processing is the same processing as in step SA34, and the details thereof will be described later with reference to FIG. 8. After the first processing is executed, the update data control unit 203 determines whether or not installation of all the downloaded programs is completed (step SA55). When determination is made that installation of all the programs is completed (YES in step SA55), the control system 1 ends the processing. When determination is made that there is any program not yet installed (NO in step SA55), the update data control unit 203 returns to step SA52.

When the programs to be installed include the non-control update program (YES in step SA51), the update data control unit 203 shifts to a waiting state to wait for the second processing (step SA56). The second processing is the processing in which the update execution unit 212 or the corresponding update execution unit 51 installs the non-control update program. The update data control unit 203 determines whether or not the operation to put the vehicle V in the ignition-off state is performed in the waiting state (step SA57).

When the operation to put the vehicle V in the ignition-off state is not performed (NO in step SA57), the update data control unit 203 waits. When the operation to put the vehicle V in the ignition-off state is performed (YES in step SA57), the update data control unit 203 execute notification to the user (step SA58). The notification in step SA58 is similar to that of step SA38.

After notification is performed, the update data control unit 203 determines whether or not the operation to put the vehicle V in the ignition-off state has been performed (step SA59). When the operation to put the vehicle V in the ignition-off state is not performed (NO in step SA59), the update data control unit 203 waits. When the operation to put the vehicle V in the ignition-off state is performed (YES in step SA59), the update data control unit 203 sets ignition-on restriction (step SA60).

The update data control unit 203 selects one program to be processed, out of one or more non-control update programs to be installed (step SA61). The update data control unit 203 identifies the ECU to be subject to installation of the selected non-control update program (step SA62). The processing of step SA62 is similar to that of step SA35.

The ECU identified by the update data control unit 203 then executes the second processing (step SA63) to install the non-control update program. The second processing is the same processing as in step SA41, and the details thereof will be described later with reference to FIG. 9.

After the second processing, the update data control unit 203 determines whether or not installation of all the downloaded non-control update programs is completed (step SA64). When there is any non-control update program not yet installed, the update data control unit 203 determines that installation of all the non-control update programs is not completed (NO in step SA64). In this case, the update data control unit 203 returns to step SA61.

When determination is made that installation of all the non-control update programs is completed (YES in step SA64), the update data control unit 203 cancels the ignition-on restriction (step SA65). Based on the operation of SSSW 27a, the update data control unit 203 determines whether or not the vehicle V is shifted to the ignition-on state under the control of the first zone ECU 20a (step SA66). When the vehicle V is not shifted to the ignition-on state (NO in step SA66), the update data control unit 203 waits. When the vehicle V is shifted to the ignition-on state (YES in step SA66), the update data control unit 203 starts to install the vehicle control update programs.

The update data control unit 203 selects one vehicle control update program to be processed, out of one or more vehicle control update programs to be installed (step SA67). The update data control unit 203 identifies the ECU to be subject to installation of the program that is selected in step SA67 (step SA68). The processing of step SA68 is similar to that of step SA33. The ECU identified by the update data control unit 203 then executes the first processing (step SA69) to install the vehicle control update program. The first processing is the same as that in step SA34. After the first processing is executed, the update data control unit 203 determines whether or not installation of all the downloaded vehicle control update programs is completed (step SA70). When determination is made that installation of all the vehicle control update programs is completed (YES in step SA70), the control system 1 ends the processing. When determination is made that there is any vehicle control update program not yet installed (NO in step SA70), the update data control unit 203 returns to step SA67.

In the processing of FIGS. 6 and 7, when there are a plurality of programs to be installed and these programs do not include any vehicle control update program, the update execution unit 212 skips steps SA67 to SA70 after executing step SA66.

Figure 8:
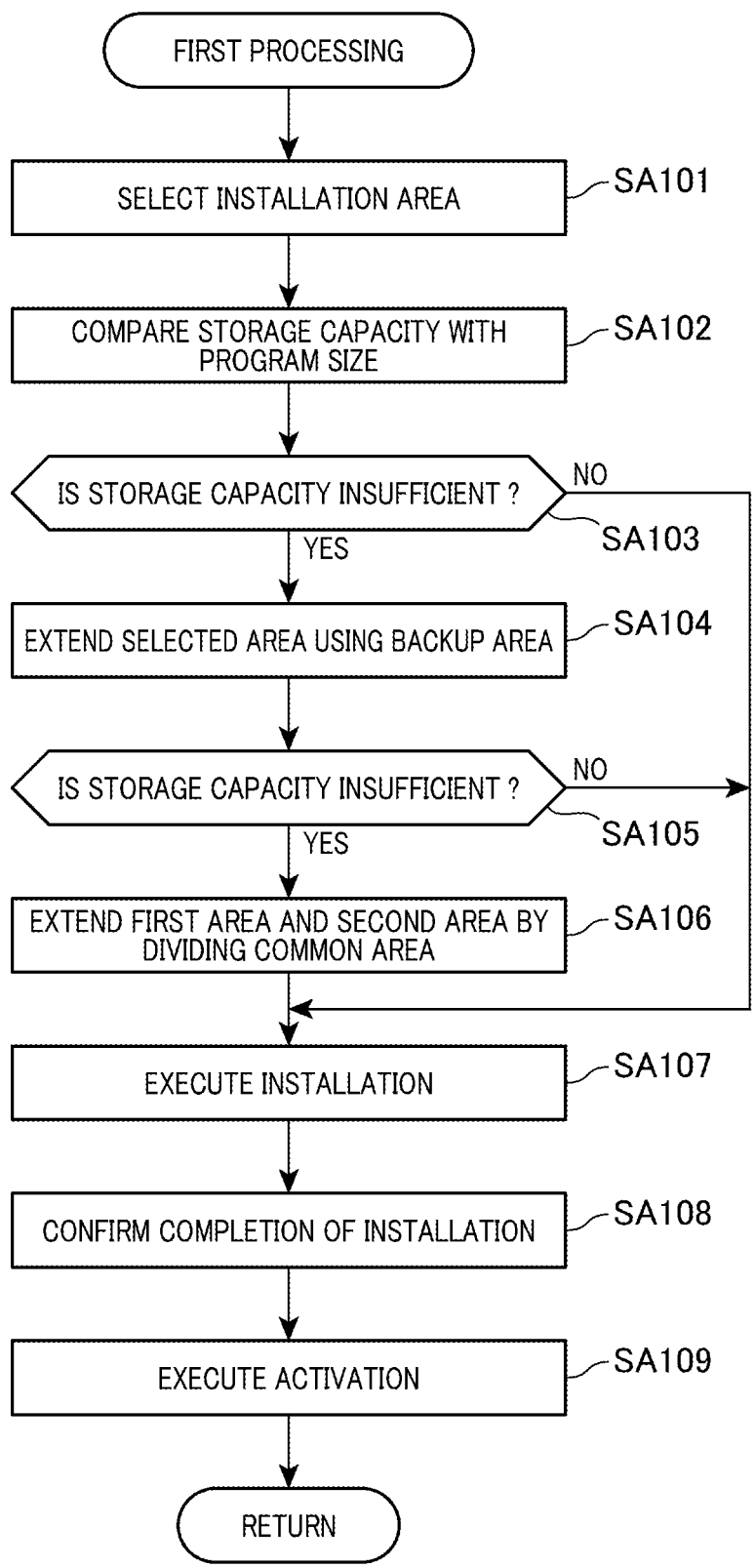
FIG. 8 is a flowchart showing operation of the control system.

FIG. 8 is a flowchart showing the details of the first processing. The first processing is the processing executed by the update execution unit 212 and the corresponding update execution unit 51. Here, an example in which the update execution unit 212 executes the first processing is described.

The update execution unit 212 selects the area for installing the vehicle control update program, out of the first program storage area 70 and the second program storage area 75 (step SA101). In step SA101, the update execution unit 212 selects either the A-side or the B-side of the data storage unit 213. The update execution unit 212 further selects either the program area or the user area. Specifically, in step SA101, the update execution unit 212 selects any one of the A-side program area 71, the A-side user area 73, the B-side program area 76, and the B-side user area 78.

In step SA101, the update execution unit 212 first selects one of the first program storage area 70 and the second program storage area 75. When the first program storage area 70 is selected, the update execution unit 212 further selects one of the A-side program area 71 and the A-side user area 73 based on the type of program to be installed. When the B-side program area 76 is selected, the update execution unit 212 further selects one of the B-side program area 76 and the B-side user area 78 based on the type of the program to be installed.

In step SA101, when the program stored in the first program storage area 70 and the program stored in the second program storage area 75 are the same, the update execution unit 212 selects one of the A-side and the B-side based on the previous setting. This operation is performed when the first program storage area 70 and the second program storage area 75 store identical programs of an identical version, and both the programs are normal. When the program stored in one of the first program storage area 70 and the second program storage area 75 is defective, the update execution unit 212 selects the area where the defective program is stored in step SA101. In addition, when the version of the program stored in the first program storage area 70 is different from the version of the program stored in the second program storage area 75, the update execution unit 212 selects the area where the program of the older version is stored in step SA101.

The update execution unit 212 compares the storage capacity of the area selected in step SA101 with the size of the vehicle control update program to be installed (step SA102). The storage capacity of the area selected in step SA101 is, for example, the storage capacity that is a sum of the capacity of a rewritable area in the selected area and a free capacity in the selected area. The size of the program is, for example, a data amount of the program or the storage capacity occupied by the program when the program is stored in the data storage unit 213.

The update execution unit 212 determines whether or not the storage capacity is insufficient based on the result of the comparison in step SA102 (step SA103). When the storage capacity of the area selected in step SA101 is not insufficient (NO in step SA103), the update execution unit 212 shifts to step SA107 described later.

When determination is made that the storage capacity of the area selected in step SA101 is insufficient (YES in step SA103), the update execution unit 212 expands the storage capacity of the area selected in step SA101 using the backup area corresponding to the selected area (step SA104). For example, when the update execution unit 212 selects the A-side program area 71 in step SA101, the update execution unit 212 determines to use the backup area 72 for installation of the vehicle control update program so as to expand the storage capacity of the A-side program area 71.

The update execution unit 212 compares the storage capacity of the area expanded in step SA104 with the size of the program to determine whether or not the storage capacity is insufficient (step SA105). When the storage capacity is not insufficient (NO in step SA105), the update execution unit 212 shifts to step SA107 described later.

When determination is made that the storage capacity is insufficient (YES in step SA105), the update execution unit 212 divides the common area 64, and uses the division areas to extend the first program storage area 70 and the second program storage area 75 (step SA106). In step SA106, the update execution unit 212 divides the common area 64 into two division areas. The update execution unit 212 uses one of the two division areas as an extension area to extend the A-side program area 71 or the A-side user area 73 in the first program storage area 70. The update execution unit 212 uses one of the two division areas as an extension area to extend the B-side program area 76 or the B-side user area 78 in the second program storage area 75. The update execution unit 212 further extends the area selected in step SA101 using one of the division areas divided in step SA106. As a result, the storage capacity of the area where the program is installed is expanded using the backup area and the extension area. The update execution unit 212 then shifts to step SA107.

In step SA107, the update execution unit 212 execute installation of the program (step SA107). Specifically, the update execution unit 212 stores the program in the area selected in step SA101 or the entire area obtained by extending the selected area.

Next, the update execution unit 212 performs processing to confirm that the installation is successfully completed (step SA108). In step SA108, the update execution unit 212 confirms that the installed program is in the state successfully executable by the central ECU 2. For example, the update execution unit 212 confirms the integrity of the program and data written to the data storage unit 213 by calculating and comparing hash values. The update execution unit 212 may update error detection data stored in the check area 66 in step SA108.

The update execution unit 212 executes activation of the installed program (step SA109). Activation is processing to set so that the control system 1 executes the installed program. For example, the update execution unit 212 rewrites the active program specification data 61a in step SA109. The update execution unit 212 rewrites the active program specification data 61a so that the central ECU 2 executes the latest vehicle control program that is written to the data storage unit 213 by the processing in steps SA101 to SA107.

Specifically, the active program specification data 61a is rewritten so as to specify the side selected in step SA101, out of the A-side and B-side of the data storage unit 213.

Figure 9:
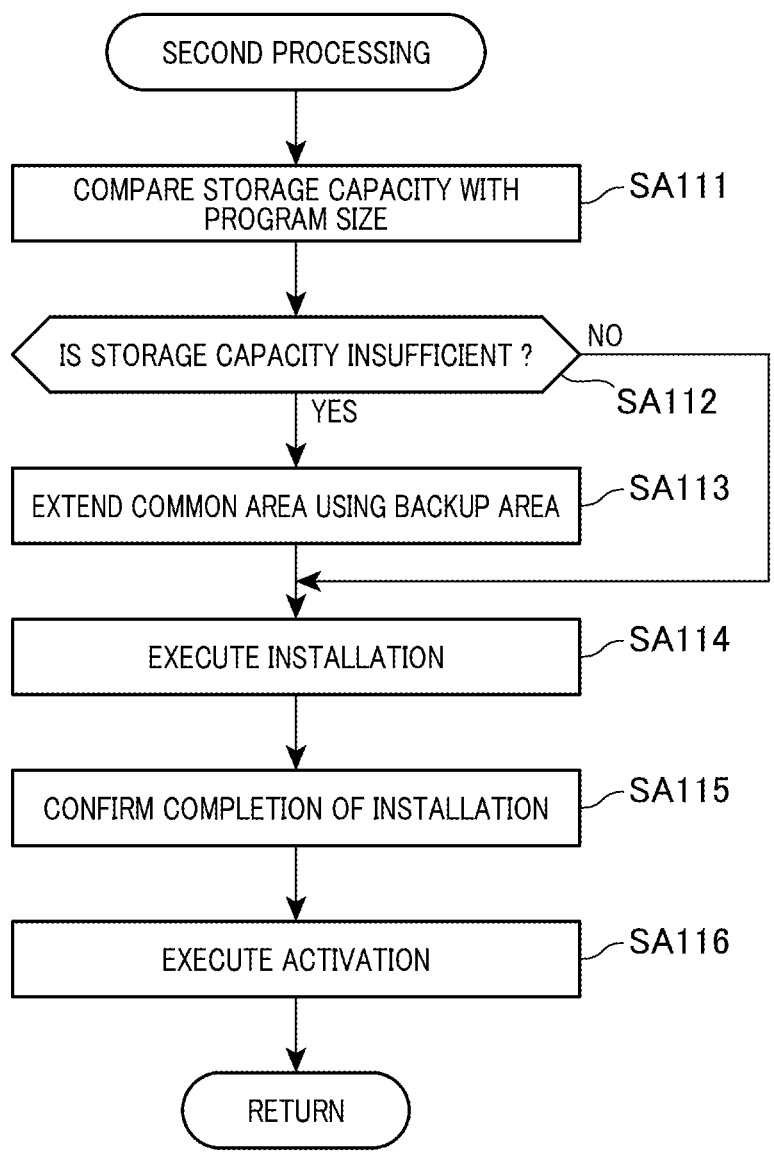
FIG. 9 is a flowchart showing operation of the control system.

FIG. 9 is a flowchart showing the details of the second processing. The second processing is the processing executed by the update execution unit 212 and the corresponding update execution unit 51. Here, an example in which the update execution unit 212 executes the second processing is described.

The area where the update execution unit 212 installs the non-control update program is the common area 64. The update execution unit 212 compares the storage capacity of the common area 64 with the size of the non-control update program to be installed (step SA111). The storage capacity of the common area 64 is, for example, the storage capacity that is a sum of the capacity of a rewritable area in the common area 64 and a free capacity in the common area 64. The size of the non-control update program is, for example, a data amount of the non-control update program or the storage capacity occupied by the non-control update program when the program is stored in the data storage unit 213.

The update execution unit 212 determines whether or not the storage capacity is insufficient based on the result of the comparison in step SA111 (step SA112). When the storage capacity is not insufficient (NO in step SA112), the update execution unit 212 shifts to step SA114 described later.

When determination is made that the storage capacity of the common area 64 is insufficient (YES in step SA112), the update execution unit 212 expands the storage capacity of the common area 64 using the backup area 65 (step SA113).

In step SA114, the update execution unit 212 execute installation of the non-control update program (step SA114). Specifically, the update execution unit 212 stores the non-control update program in the common area 64.

Next, the update execution unit 212 performs processing to confirm that the installation is successfully completed (step SA115). In step SA115, the update execution unit 212 confirms that the installed non-control update program is in the state successfully executable by the central ECU 2. For example, the update execution unit 212 confirms the integrity of the non-control update program and data written to the data storage unit 213 by calculating and comparing hash values. The update execution unit 212 may update the error detection data stored in the check area 66 in step SA115.

The update execution unit 212 executes activation of the installed program (step SA116). Activation is processing to set so that the control system 1 executes the installed non-control update program.

Figure 10:
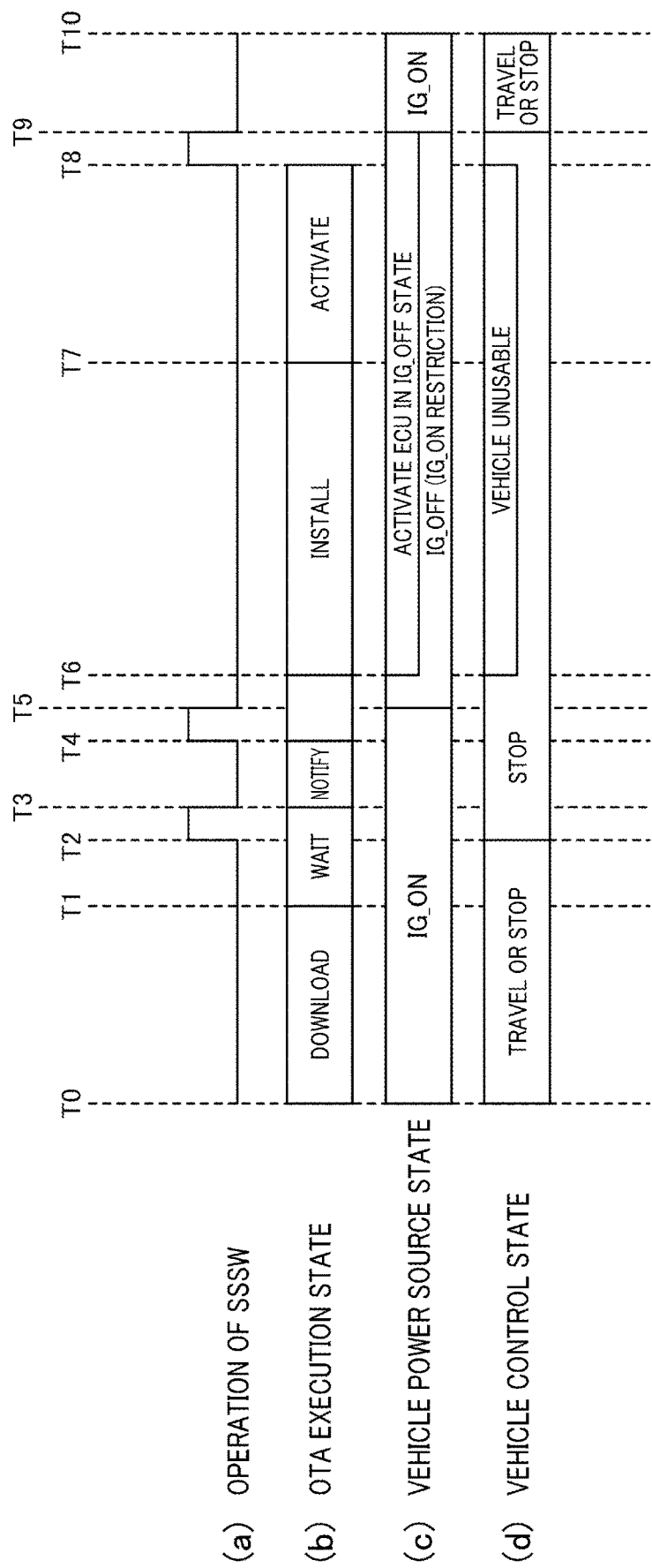
FIG. 10 is a timing chart showing an example of vehicle state transition.

FIG. 10 is a timing chart showing an example of transition of the state of the vehicle V when the operation shown in FIGS. 5 to 9 is executed. In the timing chart in FIG. 10, reference sign (a) indicates the operation state of the SSSW 27a. Reference sign (b) indicates an OTA execution state. The OTA refers to the operation of the control system 1 downloading the non-control update program and installing the program. Reference sign (c) indicates the state of the power source of the vehicle V. Reference sign (d) indicates the control state of the vehicle V. In the chart, reference sign T indicates time, and a horizontal axis corresponds to the passage of time.

Time T0 is a time point at which the control system 1 starts to download the non-control update program. While the control system 1 is downloading the non-control update program, the vehicle V is in the ignition-on state. The vehicle V may be traveling or in a stopped state.

When the download is finished at time T1, the control system 1 waits for the ignition-off operation. Here, when the user operates the SSSW 27a during T2 to T3, the control system 1 executes notification in response to the operation. The operation of the SSSW 27a includes the user pressing the SSSW 27a and the user stopping the pressing of the SSSW 27a. Therefore, the control system 1 detects the completion of the operation of the SSSW 27a when the user stops the pressing of the SSSW 27a at time T3. Since the SSSW 27a is operated to stop the functions of the vehicle V, the vehicle V is in a stopped state at time T2.

The notification by the control system 1 corresponds to the processing of steps SA38 and SA58. After the notification, the control system 1 waits for further operation of the SSSW 27a.

When the user operates the SSSW 27a at time T4 to T5, the vehicle V is shifted to the ignition-off state, with the operation of the SSSW 27a being completed as a trigger. After the vehicle V is shifted to the ignition-off state at time T5, the control system 1 activates the ECUs in the ignition-off state. Time T6 at which the ECUs are activated may be slightly later than time T5. The control system 1 may shift the vehicle V to the ignition-off state at time T5, while maintaining the activated state of the ECUs.

After the ECUs are activated at time T6, the control system 1 sets the ignition-on restriction. Therefore, after time T6, the vehicle V is in the state where traveling cannot be performed. This state is shown as a vehicle load state in FIG. 10.

At time T6, the control system 1 executes installation of the non-control update program. After installing the non-control update program, the control system 1 executes activation at time T7. After activation is completed, the control system 1 waits for operation of the SSSW 27a. When the SSSW 27a is operated during time T8 to T9, the control system 1 shifts to the ignition-on state. Shift to the ignition-on state enables the vehicle V to travel. The vehicle V may travel or continuously be in a stopped state.

There is no limit to the length of time T6 to T8. For example, the user may operate the SSSW 27a at time T5 and then get off the vehicle V. In this case, the user may operate the SSSW 27a after the lapse of a long time from time T5.

FIGS. 6, 7, and 10 illustrate an example in which notification performed by the control system 1 is triggered by the operation of the SSSW 27a. Specifically, in the illustrated example, the control system 1 determines whether the SSSW 27*a* is operated or not in steps SA37 and SA57, and when the SSSW 27*a* is operated, the control system 1 performs notification in steps SA38 and SA58. This is merely an example, and the trigger for notification is not limited to the operation of the SSSW 27*a*. For example, the trigger for the control system 1 to perform notification may be getting-off preparation operation. The getting-off preparation operation is operation to estimate the user getting off the vehicle V. For example, the getting-off preparation operation refers to operating the shift SW 27*b* to select P position, operating a parking brake, and opening and closing a door. In this case, the control system 1 determines whether or not the getting-off preparation operation is performed in steps SA37 and SA57, and when the getting-off preparation operation is performed, notification in steps SA38 and SA58 is executed. In this case, the operation at time T2 to T3 in FIG. 10 is omitted.

The above embodiment shows a specific example in which the present invention is applied, and does not intend to limit the form of application of the present invention.

In the above embodiment, an example is shown in which the control system 1 installs in the common area 64 the non-control update program, among the programs downloaded from server 110. This configuration is merely an example, and the control system 1 may be configured to, for example, distinguish between programs downloaded based on the operation of a user who is the owner or the user of the vehicle V and programs downloaded based on the operation of a rental user who is not the owner nor the user of the vehicle V. The control system 1 stores vehicle control update programs, downloaded based on the operation of the user who is the owner or the user of the vehicle V, in the first program storage area 70 or the second program storage area 75. The control system 1 installs the programs downloaded based on the operation of the rental user in the common area 64 regardless of whether the programs are vehicle control update programs or the non-control update programs. The owner or the user corresponds to an example of the first user. The rental user corresponds to an example of the second user.

The control system 1 also installs the non-control update programs downloaded based on the operation of the user who is the owner or the user of the vehicle V in the common area 64. The control system 1 installs the non-control update programs downloaded based on the operation of the rental user in a visitor common area that is provided in the common area 64. In other words, the visitor common area is formed by using part of the common area 64. The non-control update programs, downloaded based on the operation of the user who is the owner or the user of the vehicle V, are installed in an area other than the visitor common area in the common area 64.

In this case, the control system 1 is configured to be able to determine whether or not the user operating the vehicle V is the owner or the user of the vehicle V. For example, the control system 1 can register the owner or the user of the vehicle V in advance, and can execute processing of determining whether or not the user operating the vehicle V is the registered owner or user. The rental user refers to a user who is neither the owner nor the user registered in the vehicle V. For example, the rental user is a user who rents the vehicle V from the owner or the user of the vehicle V. When the vehicle V is used in car sharing among individuals, a car sharing user corresponds to the rental user.

The operation of the control system 1 in this case will be described as a modification.

Figure 11:
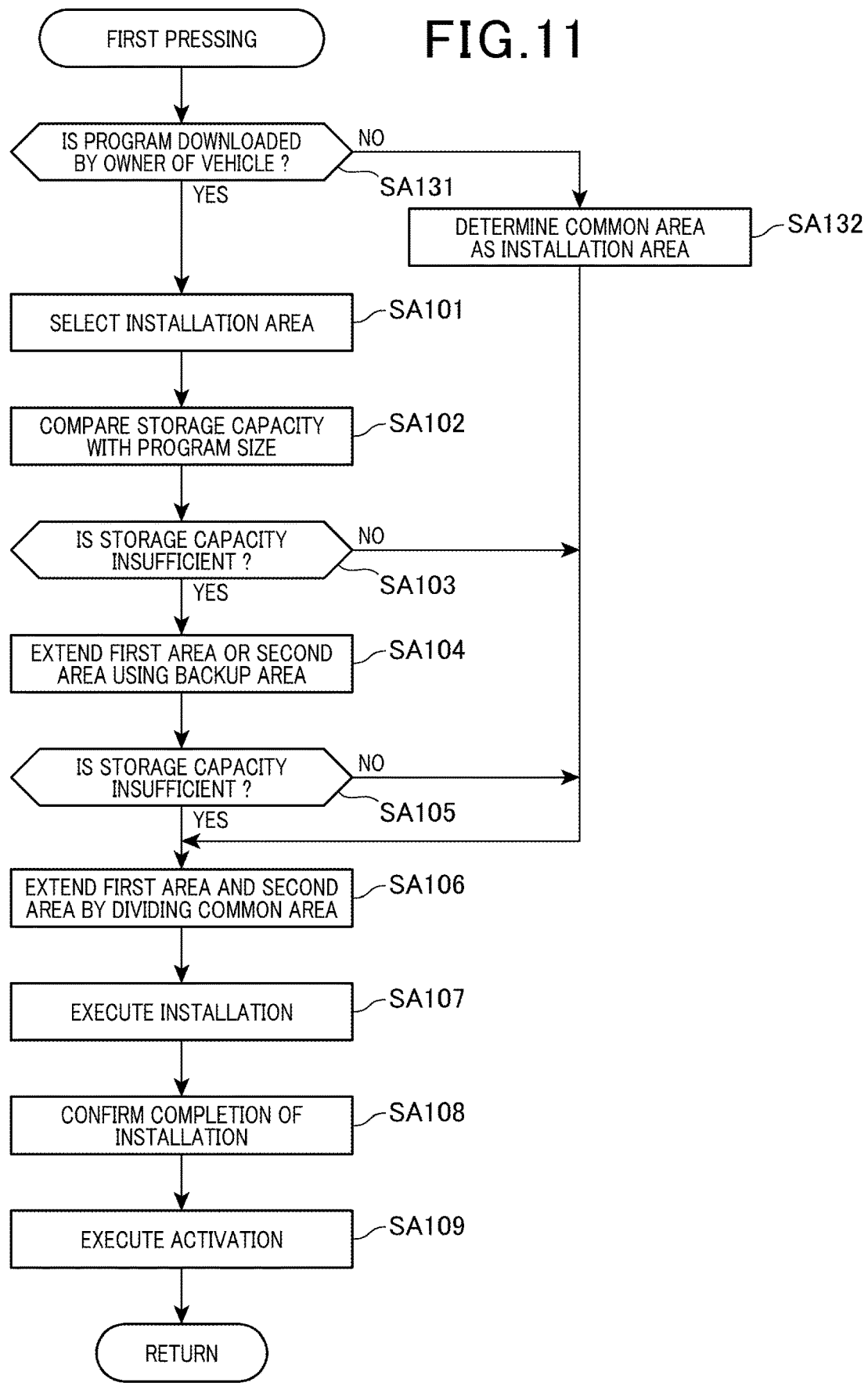
FIG. 11 is a flowchart showing operation of the control system in a modification.
Figure 12:
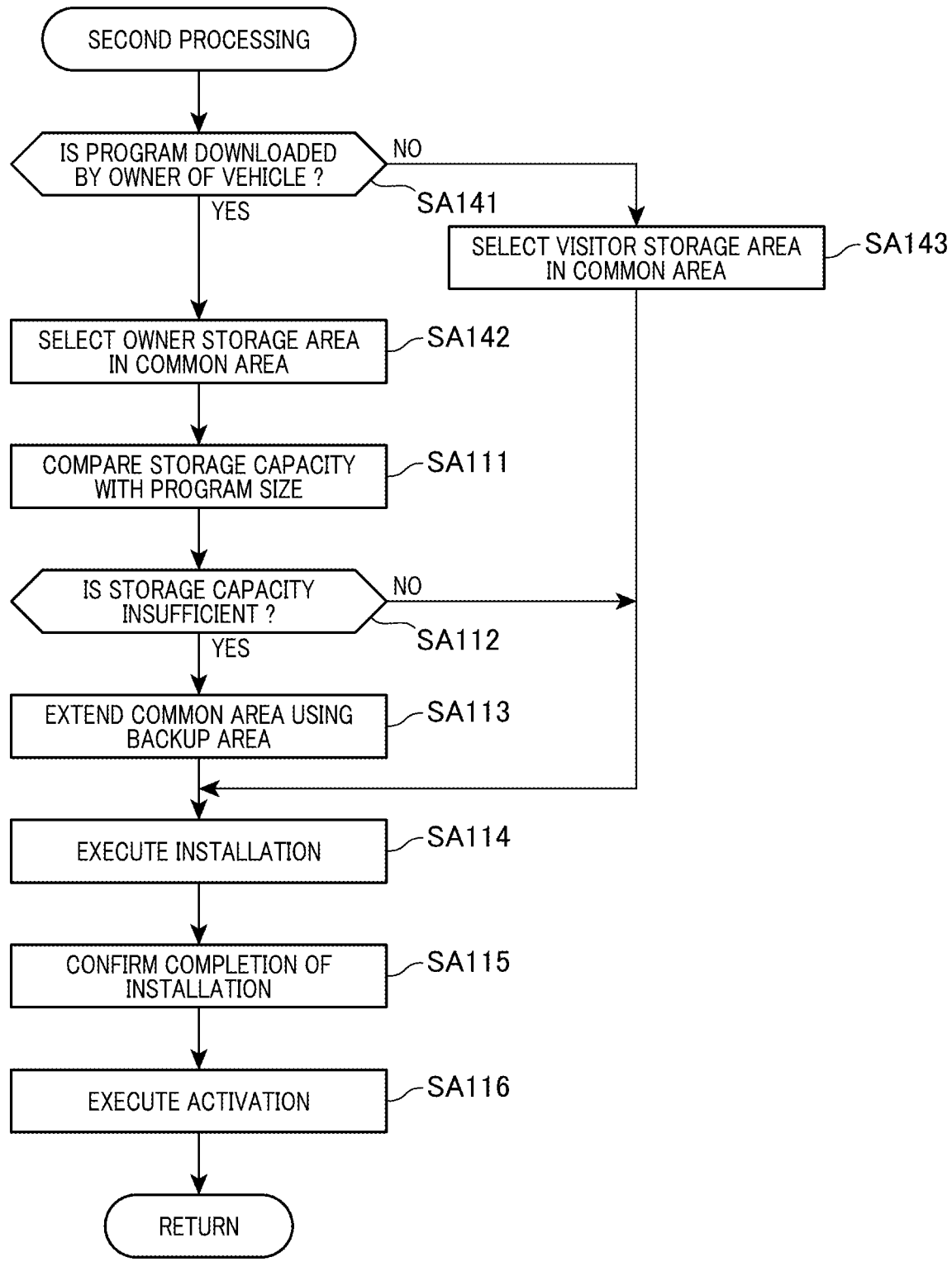
FIG. 12 is a flowchart showing operation of the control system in the modification.

FIGS. 11 and 12 are flowcharts showing the operation of the control system 1 in the modification. FIG. 11 shows the first processing, and FIG. 12 shows the second processing. The processings in FIG. 11 in common with those in FIG. 8 are designated by the same step numbers, and description thereof is omitted. The processings in FIG. 12 in common with those in FIG. 9 are designated by the same step numbers, and description thereof is omitted.

In the first processing shown in FIG. 11, the update execution unit 212 determines whether or not the vehicle control update program to be installed is a program downloaded in response to the operation of a user who is the owner or the user of the vehicle V (step SA131). Here, the operation is, for example, operation on the touch panel mounted on the vehicle V. When the vehicle control update program is downloaded in response to the operation of the user who is the owner or the user of the vehicle V (YES in step SA131), the update execution unit 212 shifts to step SA101.

Meanwhile, when the vehicle control update program is downloaded in response to the operation of the rental user (No in step SA131), the update execution unit 212 sets the common area 64 as the installation area, and shifts to step SA107.

In the second processing shown in FIG. 12, the update execution unit 212 determines whether or not the non-control update program to be downloaded is a program downloaded in response to the operation of a user who is the owner or the user of the vehicle V (step SA141). When the non-control update program is downloaded in response to the operation of the user who is the owner or the user of the vehicle V (YES in step SA141), the update execution unit 212 shifts to step SA142.

In step SA142, the update execution unit 212 selects an area other than the visitor common area in the common area 64, that is, an owner storage area as the installation area. The update execution unit 212 then shifts to step SA111.

Meanwhile, when the non-control update program is downloaded in response to the operation of the rental user (No in step SA141), the update execution unit 212 sets the visitor common area provided in the common area 64 as the installation area (step SA143). The update execution unit 212 then shifts to step SA114.

In this modification, the programs installed by the intention of the owner or the user of vehicle V and the programs installed by the intention of the rental user are installed in different storage areas in the data storage unit 213. Hence, programs can be distinguished based on whether or not the user who instructs the installation is the owner or the user. For example, it is possible to restrict program deletion or program execution for only the case where programs are installed by the intention of the rental user. For example, it is also possible to allocate a backup area as the storage area for storing the programs installed by the intention of the owner or the user of the vehicle V. Therefore, when the rental user rents the vehicle V through car sharing between individuals, and installs programs to the vehicle V, the installed programs can be managed by the intention of the owner or the user of the vehicle V.

In the above embodiment and modification, the configuration has been described in which the vehicle control update programs or the non-control update programs are downloaded from the server 110 to the control system 1 by the user operating the touch panel or the like. This configuration is merely an example, and the control system 1 may be configured to download vehicle control update programs from the server 110 without requiring user operation, for example. The control system 1 may also be configured to download non-control update programs from the server 110 without requiring user operation. In these cases, the control system 1 may be configured to install downloaded vehicle control update programs and/or non-control update programs based on user operation. In addition, the control system 1 may install the vehicle control update programs without any user operation.

In the above embodiment and modification, an example of the control system 1 operating as a program management device has been described. Specifically, the control system 1 includes the data storage units 52 and 213 that store the vehicle control programs and the irrespective programs, and manages update of the vehicle control programs and the irrespective programs. This configuration is merely an example, and the program management device may be configured as part of the control system 1, and an external device connected to the control system 1 may be configured to function as the program management device, for example.

The configuration of the control system 1 shown in the above embodiment is also merely an example, and the types of the ECUs included in the control system 1, the number of the ECUs, and the configuration of the devices to be controlled by the ECUs can be changed in various ways.

FIGS. 1 and 3 are schematic configuration diagrams showing the functional configuration of respective devices of the program management system 100, the functional configuration being divided according to main processing contents for easy understanding of the present invention. Therefore, FIGS. 1 and 3 do not limit the configuration of the devices. Each processing shown in FIGS. 5 to 9, and FIGS. 11 to 12 may be executed by a single program or may be executed by a plurality of programs.

The embodiment disclosed supports the following configuration.

(Configuration 1) A program management device including: a communication unit that communicates with an external device that is present outside a vehicle; a control unit that executes a vehicle control program for controlling the vehicle; a first program storage area where the vehicle control program is stored; a second program storage area where the vehicle control program is stored; a third program storage area where an irrespective program is stored to perform control that is irrespective of driving of the vehicle; and a program update unit that executes first processing of storing in at least one of the first program storage area and the second program storage area a vehicle control update program received by the communication unit, the vehicle control update program being used to update the vehicle control program, and second processing of storing in the third program storage area a non-control update program received by the communication unit, the non-control update program being used to update the irrespective program.

According to the program management device in configuration 1, by duplicating the storage area where the vehicle control program for controlling the vehicle is stored, the vehicle control program can be held in an area that is not affected by the update of the vehicle control program while the update is performed. Therefore, there is no need to limit the timing for program update in case a problem occurs in the program update. Therefore, it is possible to reduce the restriction of timing for program update. Since the third program storage area where the non-control update program is stored is not duplexed, the increase in storage capacity can be restrained. Furthermore, since the third program storage area is set as an area different from the first program storage area and the second program storage area, the area for storing the vehicle control program is prevented from becoming insufficient because of storing the non-control update program. Therefore, it is possible to restrain the increase in storage capacity of the storage area for storing the vehicle program and to thereby avoid an insufficient storage area where the program is stored.

(Configuration 2) The program management device according to claim 1, in which the first program storage area includes a first program backup storage area, and the second program storage area includes a second program backup storage area.

The program management device in configuration 2 can cope with the insufficient storage capacity of the storage area where the vehicle control update program is stored.

(Configuration 3) The program management device according to configuration 2, in which when a storage capacity of the first program storage area or the second program storage area is insufficient in the first processing, the program update unit stores at least part of the vehicle control update program in the first program backup storage area or the second program backup storage area.

According to the program management device in configuration 3, when the storage capacity of the storage area where the vehicle control update program is stored is insufficient, the vehicle control update program can be stored by using the first program backup storage area or the second program backup storage area. This makes it possible to avoid the inability to update the vehicle control program due to insufficient storage capacity.

(Configuration 4) The program management device according to any one of configurations 1 to 3, in which the third program storage area includes a third program backup storage area.

The program management device in configuration 4 can cope with the insufficient storage capacity of the storage area where the non-control update program is stored.

(Configuration 5) The program management device according to configuration 4, in which when a storage capacity of the third program storage area is insufficient in the second processing, the program update unit stores at least part of the non-control update program in the third program backup storage area.

According to the program management device in configuration 5, when the storage capacity of the storage area where the non-control update program is stored is insufficient, the non-control update program can be stored by using the third program backup storage area. This makes it possible to avoid the inability to update the irrespective program due to insufficient storage capacity.

(Configuration 6) The program management device according to any one of configurations 1 to 5, in which when the first processing and the second processing are executable, the program update unit executes the first processing after completing the second process.

According to the program management device in configuration 6, processing the non-control update program prior to the vehicle control update program makes it possible to prevent the vehicle control program relating to the control of the vehicle from being affected in case where the update of the program using the non-control update program has a problem or the like.

(Configuration 7) The program management device according to any one of configurations 1 to 6, in which the control unit is allowed to set as a power source state of the vehicle a power-on state where a driving source of the vehicle is controllable and a power-off state where the driving source is not controllable, and when the program update unit executes the second processing, the control unit sets so as not to switch to the power-on state until the second processing is completed.

The program management device in configuration 7 maintains the vehicle in the power-off state until the second processing is completed. This prevents the vehicle from executing the second program while the irrespective program is updated based on the non-control update program, so that the update of the irrespective program can be executed more reliably.

(Configuration 8) The program management device according to configuration 7, in which when the power source state is switched from the power-on state to the power-off state while the program update unit is allowed to start the second processing, the control unit notifies that there is a period where switching to the power-on state is not allowed.

The program management device in configuration 8 can minimize the impact on the user convenience associated with the program update by notifying the user in advance that there is a period where vehicle is unusable.

(Configuration 9) The program management device according to any one of configurations 1 to 8, in which when a storage capacity of the first program storage area or the second program storage area is insufficient in the first processing, the program update unit uses the third program storage area to form an extension area, and stores at least part of the vehicle control update program in the extension area.

The program management device in configuration 9 makes it possible to avoid the inability to update the vehicle control program due to insufficient storage capacity.

(Configuration 10) The program management device according to configuration 9, in which the program update unit divides the third program storage area into two division areas, and uses one of the division areas as the extension area corresponding to the first program storage area while using another one of the division areas as the extension area corresponding to the second program storage unit.

The program management device in configuration 10 can extend the storage area so that the difference in storage capacity between the first program storage area and the second program storage area does not increase. This makes it possible to maintain the appropriately duplicated state of the storage area where the vehicle control program is stored.

(Configuration 11) The program management device according to any one of configurations 1 to 10, in which the program update unit stores, in the first program storage area or the second program storage area, the vehicle control update program received from the communication unit based on operation of a first user who is registered on the vehicle, and stores in the third program storage area the vehicle control update program received from the communication unit based on operation of a second user who is different from the first user.

The program management device in configuration 11 can perform the processing of the vehicle control update program differently between when the vehicle control update program is downloaded by the intention of the first user and when the vehicle control update program is downloaded by the intention of the second user. This makes it possible to perform the processing of the downloaded vehicle control update program differently depending on the user who instructs the download, and to thereby facilitate maintenance and management of the program.

(Configuration 12) The program management device according to configuration 11, in which the program update unit stores the non-control update program received from the communication unit based on the operation of the first user and the non-control update program received from the communication unit based on the operation of the second user in different storage areas in the third program storage area.

The program management device in configuration 12 can perform different processings on the downloaded non-control update program depending on the user who instructs the download, and to thereby facilitate maintenance and management of the program.

(Configuration 13) The program management device according to configuration 12, in which when a storage capacity of the first program storage area or the second program storage area is insufficient in the first processing, the program update unit stores at least part of the vehicle control update program in an area of the third program storage area where the non-control update program received by the communication unit based on the operation of the second user is stored.

The program management device in configuration 13 can allocate the storage capacity to the vehicle control update program downloaded based on the instruction of the registered first user in preference to the non-control update program downloaded based on the instruction of the second user. Therefore, the vehicle control update program with higher importance can be downloaded and installed more reliably.

(Configuration 14) A program management method using a program management device including a communication unit that communicates with an external device present outside a vehicle and a storage unit, the method including: providing the storage unit with a first program storage area where a vehicle control program for controlling the vehicle is stored, a second program storage area where the vehicle control program is stored, and a third program storage area where an irrespective program is stored to perform control that is irrespective of driving of the vehicle; and executing first processing of storing in at least one of the first program storage area and the second program storage area a vehicle control update program received by the communication unit, the vehicle control update program being used to update the vehicle control program, and second processing of storing in the third program storage area a non-control update program received by the communication unit, the non-control update program being used to update the irrespective program.

According to the program management method in configuration 14, since the storage area where the vehicle control program for controlling the vehicle is stored is duplicated, the vehicle control program can be held in an area that is not affected by the update of the vehicle control program during the update is performed. Accordingly, there is no need to restrict the timing for program update in case a problem occurs in the program update. Therefore, it is possible to reduce the restriction of timing for program update. Moreover, since the third program storage area where the non-control update program is stored is not duplexed, the increase in storage capacity of the storage area can be restrained. Furthermore, since the third program storage area is set as an area different from the first program storage area and the second program storage area, the area for storing the vehicle control program is prevented from becoming insufficient because of storing the non-control update program. This makes it possible to restrain the increase in storage capacity of the storage area for storing the vehicle program and to thereby avoid an insufficient storage area for storing the program.

(Configuration 15) A recording medium storing a program executed by a computer that controls a program management device, the program management device including a communication unit that communicates with an external device present outside a vehicle and a storage unit, in which the storage unit includes a first program storage area where a vehicle control program for controlling the vehicle is stored, a second program storage area where the vehicle control program is stored, and a third program storage area where an irrespective program is stored to perform control that is irrespective of driving of the vehicle, and the program causes the computer to execute: first processing of storing in at least one of the first program storage area and the second program storage area a vehicle control update program received by the communication unit, the vehicle control update program being used to update the vehicle control program; and second processing of storing in the third program storage area a non-control update program received by the communication unit, the non-control update program being used to update the irrespective program.

According to the program stored in the recording medium in configuration 15, the storage area where the vehicle control program for controlling the vehicle is stored is duplicated, so that the vehicle control program can be held in an area that is not affected by the update of the vehicle control program while the updated is performed. Accordingly, there is no need to restrict the timing for program update in case a problem occurs in the program update.

Therefore, it is possible to reduce the restriction of timing for program update. Since the third program storage area where the non-control update program is stored is not duplexed, the increase in storage capacity can be restrained. Furthermore, since the third program storage area is set as an area different from the first program storage area and the second program storage area, the area for storing the vehicle control program is prevented from becoming insufficient because of storing the non-control update program. This makes it possible to restrain the increase in storage capacity of the storage area for storing the vehicle program and to thereby avoid an insufficient storage area for storing the program.

REFERENCE SIGNS LIST

1 . . . Control system (program management device), 2 . . . Central control unit (ECU), 12 . . . Communication unit (TCU), 20 . . . Zone ECU (control unit), 20a . . . First zone ECU (control unit), 20b . . . Second zone ECU (control unit), 20C . . . Third zone ECU (control unit), 25a . . . Shift device, 25b . . . Driving source, 27A . . . SSSW, 27b . . . Shift SW, 30, 30a, 30b, 30c, 30e, 30f, 30g, 30h, 30i . . . ECU, 30d . . . ECU (control unit), 51, 51a, 51b, 51c, 212: Update execution unit (program update unit), 52, 52a, 52b, 52c, 213 . . . Data storage unit, 61 . . . Boot sector, 62 . . . A-side boot image storage area, 63 . . . B-side boot image storage area, 64 . . . Common area (third program storage area), 65 . . . Backup area (third program backup storage area), 66 . . . Check area, 70 . . . First program storage area, 71 . . . A-side program area, 72, 74 . . . Backup area (first program backup storage area), 73 . . . A-side user area, 75 . . . Second program storage area, 76 . . . B-side program area, 77, 79 . . . backup area (second program backup storage area), 78 . . . B-side user area, 100 . . . program management system, 110 . . . server, 120 . . . vehicle diagnostic device, 201 . . . update control unit, 202 . . . update data reception unit, 203 . . . Update data control unit, 211 . . . Data processing unit, V . . . vehicle.

What is claimed is:

1. A program management device, comprising:
    a communication unit configured to communicate with an external device that is present outside a vehicle;
    a control unit configured to execute a vehicle control program for performing a control relating to travel of the vehicle;
    a first program storage area where the vehicle control program is stored;
    a second program storage area where the vehicle control program is stored;
    a third program storage area where an irrespective program is stored to perform control that is irrespective of driving of the vehicle; and
    a program update unit configured to execute
    first processing of storing in at least one of the first program storage area and the second program storage area a vehicle control update program received by the communication unit, the vehicle control update program being used to update the vehicle control program, and
    second processing of storing in the third program storage area a non-control update program received by the communication unit, the non-control update program being used to update the irrespective program,
    wherein the first program storage area includes a first program backup storage area, and the second program storage area includes a second program backup storage area, and
    wherein when a storage capacity of the first program storage area or the second program storage area is insufficient in the first processing, the program update unit stores at least part of the vehicle control update program in the first program backup storage area or the second program backup storage area.

2. The program management device according to claim 1, wherein the third program storage area includes a third program backup storage area.

3. The program management device according to claim 2, wherein when a storage capacity of the third program storage area is insufficient in the second processing, the program update unit stores at least part of the noncontrol update program in the third program backup storage area.

4. The program management device according to claim 1, wherein when the first processing and the second processing are executable, the program update unit executes the first processing after completing the second process.

5. The program management device according to claim 1, wherein
    the control unit is allowed to set as a power source state of the vehicle a power-on state where a driving source of the vehicle is controllable and a power-off state where the driving source is not controllable, and
    when the program update unit executes the second processing, the control unit sets so as not to switch to the power-on state until the second processing is completed.

6. The program management device according to claim 5, wherein when the power source state is switched from the power-on state to the power-off state while the program update unit is allowed to start the second processing, the control unit notifies that there is a period where switching to the power-on state is not allowed.

7. The program management device according to claim 1, wherein when a storage capacity of the first program storage area or the second program storage area is insufficient in the first processing, the program update unit uses the third program storage area to form an extension area, and stores at least part of the vehicle control update program in the extension area.

8. The program management device according to claim 7, wherein the program update unit divides the third program storage area into two division areas, and uses one of the division areas as the extension area corresponding to the first program storage area while using another one of the division areas as the extension area corresponding to the second program storage unit.

9. The program management device according to claim 1, wherein the program update unit stores, in the first program storage area or the second program storage area, the vehicle control update program received from the communication unit based on operation of a first user who is registered on the vehicle, and stores in the third program storage area the vehicle control update program received from the communication unit based on operation of a second user who is different from the first user.

10. The program management device according to claim 9, wherein the program update unit stores the non-control update program received from the communication unit based on the operation of the first user and the non-control update program received from the communication unit based on the operation of the second user in different storage areas in the third program storage area.

11. The program management device according to claim 10, wherein when the storage capacity of the first program storage area or the second program storage area is insufficient in the first processing, the program update unit stores at least part of the vehicle control update program in an area of the third program storage area where the non-control update program received by the communication unit based on the operation of the second user is stored.

12. A program management method using a program management device including a communication unit that communicates with an external device present outside a vehicle and a storage unit, the method comprising:
providing the storage unit with a first program storage area where a vehicle control program for performing a control relating to travel of the vehicle is stored,
a second program storage area where the vehicle control program is stored, and a third program storage area where an irrespective program is stored to perform control that is irrespective of driving of the vehicle; and
executing first processing of storing in at least one of the first program storage area and the second program storage area a vehicle control update program received by the communication unit, the vehicle control update program being used to update the vehicle control program, and second processing of storing in the third program storage area a non-control update program received by the communication unit, the non-control update program being used to update the irrespective program,
wherein the first program storage area includes a first program backup storage area, and the second program storage area includes a second program backup storage area, and
wherein when a storage capacity of the first program storage area or the second program storage area is insufficient in the first processing, the program management method further includes executing storing of at least part of the vehicle control update program in the first program backup storage area or the second program backup storage area.

13. A non-transitory computer-readable recording medium storing a program executed by a computer that controls a program management device, the program management device including a communication unit that communicates with an external device present outside a vehicle and a storage unit,
Wherein the storage unit includes a first program storage area where a vehicle control program for performing a control relating to travel of the vehicle is stored,
a second program storage area where the vehicle control program is stored, and a third program storage area where an irrespective program is stored to perform control that is irrespective of driving of the vehicle, and
the program causes the computer to execute:
first processing of storing in at least one of the first program storage area and the second program storage area a vehicle control update program received by the communication unit, the vehicle control update program being used to update the vehicle control program, and
second processing of storing in the third program storage area a non-control update program received by the communication unit, the non-control update program being used to update the irrespective program,
wherein the first program storage area includes a first program backup storage area, and the second program storage area includes a second program backup storage area, and
wherein when a storage capacity of the first program storage area or the second program storage area is insufficient in the first processing, the program causes the computer to execute storing of at least part of the vehicle control update program in the first program backup storage area or the second program backup storage area.

* * * * *